(12) United States Patent
Qian et al.

(10) Patent No.: US 7,139,799 B2
(45) Date of Patent: Nov. 21, 2006

(54) SYSTEM FOR ENABLING MULTIPLE CLIENTS TO INTERACT TOGETHER OVER A NETWORK WITH A SECURE WEB PAGE

(75) Inventors: Dahong Qian, Westford, MA (US); Matthew Eichner, Brookline, MA (US); Feiyu Xie, Waltham, MA (US); James Ward, Nahant, MA (US); Cheng Zhang, Woburn, MA (US)

(73) Assignee: Net2Phone, Inc., Newark, NJ (US)

( * ) Notice: Subject to any disclaimer, the term of this patent is extended or adjusted under 35 U.S.C. 154(b) by 705 days.

(21) Appl. No.: 09/777,959

(22) Filed: Feb. 7, 2001

(65) Prior Publication Data

US 2002/0032731 A1 Mar. 14, 2002

Related U.S. Application Data

(60) Provisional application No. 60/180,589, filed on Feb. 7, 2000.

(51) Int. Cl.
*G06F 15/16* (2006.01)

(52) U.S. Cl. ............... 709/205; 709/217; 709/227; 719/313

(58) Field of Classification Search ........ 719/310–318, 719/328, 329–332; 707/10, 9; 709/200–209, 709/217–237
See application file for complete search history.

(56) References Cited

U.S. PATENT DOCUMENTS

| | | | |
|---|---|---|---|
| 5,930,801 A | | 7/1999 | Falkenhainer et al. |
| 5,978,840 A | * | 11/1999 | Nguyen et al. ............. 709/217 |
| 5,991,796 A | | 11/1999 | Anupam et al. |
| 6,011,537 A | * | 1/2000 | Slotznick .................... 715/733 |
| 6,035,332 A | | 3/2000 | Ingrassia, Jr. et al. |
| 6,047,268 A | | 4/2000 | Bartoli et al. |
| 6,070,185 A | * | 5/2000 | Anupam et al. ............ 709/204 |
| 6,092,053 A | | 7/2000 | Boesch et al. |
| 6,163,772 A | * | 12/2000 | Kramer et al. ................. 705/79 |
| 6,189,032 B1 | * | 2/2001 | Susaki et al. ............... 709/225 |
| 6,237,023 B1 | * | 5/2001 | Yoshimoto .................. 709/203 |
| 6,308,212 B1 | * | 10/2001 | Besaw et al. ............... 709/228 |
| 6,353,851 B1 | * | 3/2002 | Anupam et al. ............ 709/204 |
| 6,360,250 B1 | * | 3/2002 | Anupam et al. ............ 709/204 |
| 6,411,989 B1 | * | 6/2002 | Anupam et al. ............ 709/204 |

(Continued)

OTHER PUBLICATIONS

T. Umeda, et al., "Design and Development of a Cooperative Shopping System with Shared Discussion Space" Proc. CSCW'98, ACM, c1998, pp. 99-108.

*Primary Examiner*—John Follansbee
*Assistant Examiner*—Haresh Patel
(74) *Attorney, Agent, or Firm*—Davidson Berquist Jackson & Gowdey, LLP

(57) ABSTRACT

A group-browsing system for a plurality of clients each including a shared web browser. A server is linked to the shared web browser of each client and is configured to monitor the transmission of the web site URL request from the shared web browser of one client of the group and to direct the request to the shared web browser of other clients in the group. A gatekeeper module is configured to first mask the identity of each client's computer on the shared browser. This prevents the web site from retrieving any client's actual identifier. Second, the gatekeeper is also configured to create a same temporary identifier for each client when any client logs on to the web site so that the same web page is displayed for all the clients in the group.

20 Claims, 28 Drawing Sheets

U.S. PATENT DOCUMENTS

| | | | |
|---|---|---|---|
| 6,463,454 B1 * | 10/2002 | Lumelsky et al. | 718/105 |
| 6,609,203 B1 * | 8/2003 | Gaston | 713/193 |
| 6,643,696 B1 * | 11/2003 | Davis et al. | 709/224 |
| 6,675,216 B1 * | 1/2004 | Quatrano et al. | 709/229 |
| 6,687,739 B1 * | 2/2004 | Anupam et al. | 709/204 |
| 6,694,335 B1 * | 2/2004 | Hopmann et al. | 707/201 |
| 6,694,362 B1 * | 2/2004 | Secor et al. | 709/223 |
| 6,748,420 B1 * | 6/2004 | Quatrano et al. | 709/205 |
| 6,763,386 B1 * | 7/2004 | Davis et al. | 709/224 |
| 6,798,768 B1 * | 9/2004 | Gallick et al. | 370/352 |
| 2001/0023442 A1 * | 9/2001 | Masters | 709/227 |
| 2001/0051982 A1 * | 12/2001 | Graziani | 709/204 |
| 2002/0007317 A1 * | 1/2002 | Callaghan et al. | 705/26 |
| 2002/0073152 A1 * | 6/2002 | Andrew et al. | 709/204 |
| 2002/0073155 A1 * | 6/2002 | Anupam et al. | 709/205 |
| 2002/0078212 A1 * | 6/2002 | Besaw et al. | 709/228 |
| 2003/0025836 A1 * | 2/2003 | An et al. | 348/584 |

* cited by examiner

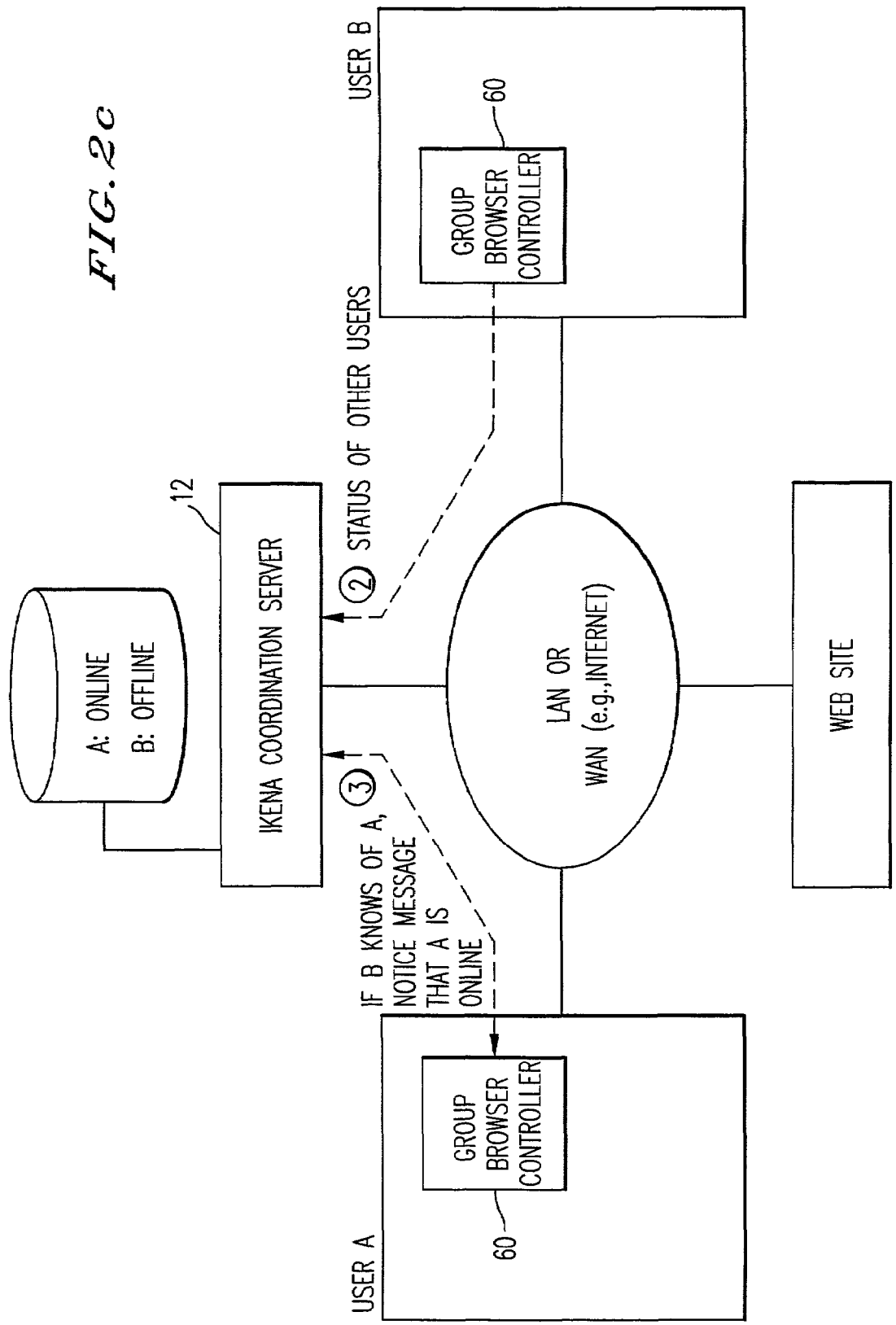

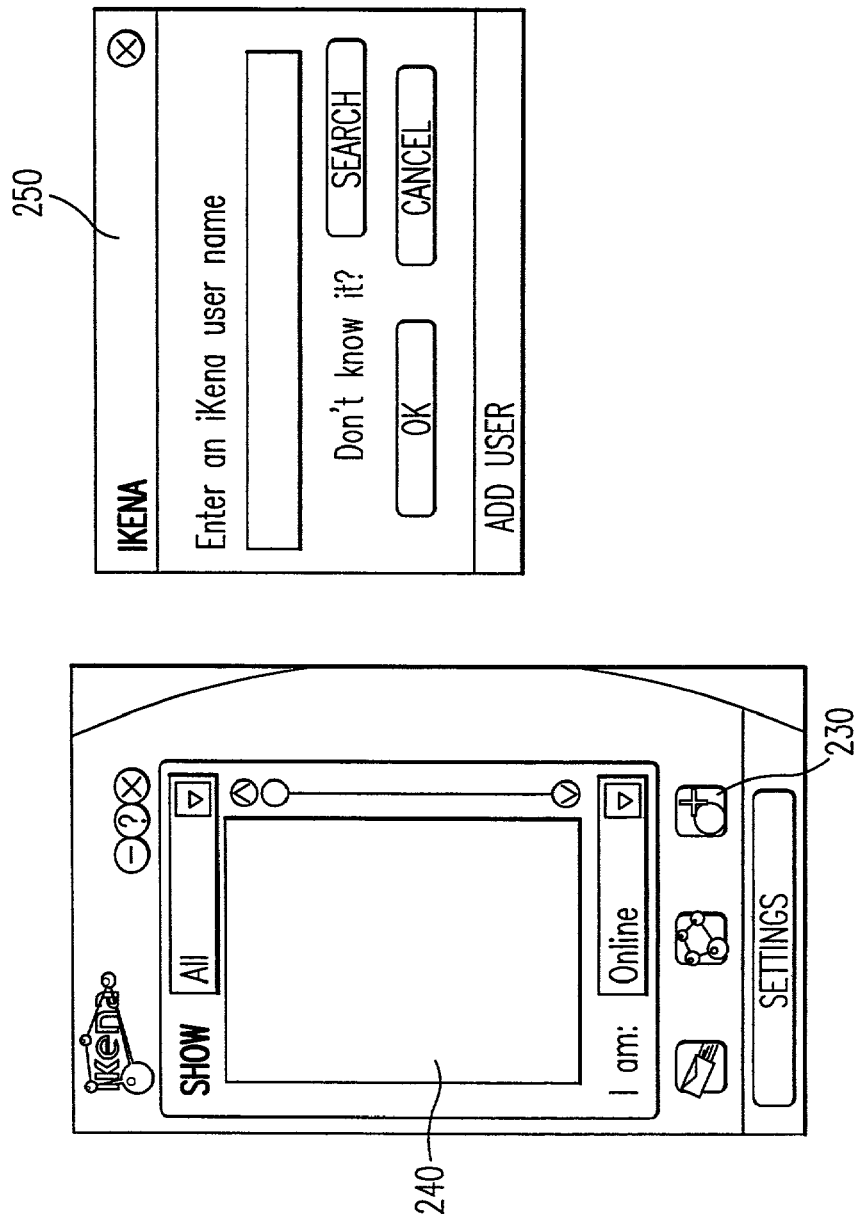

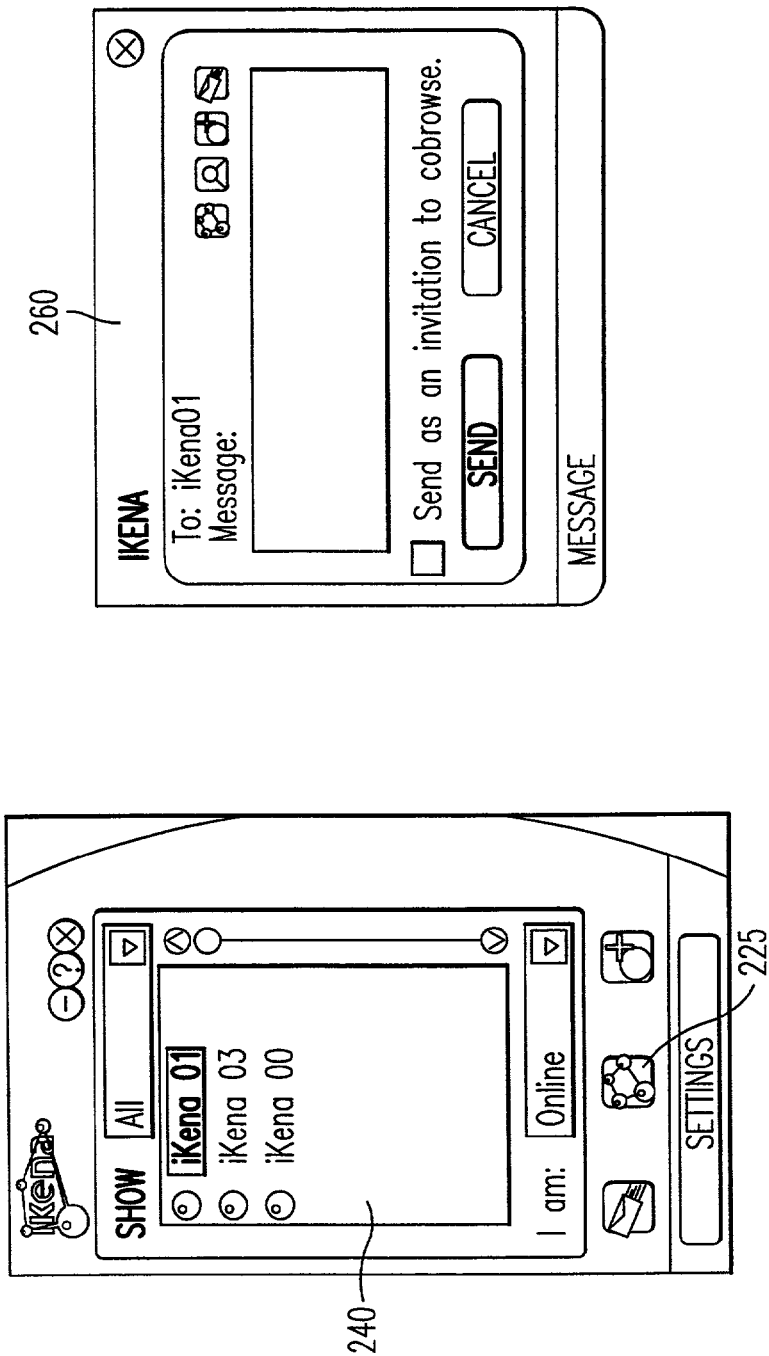

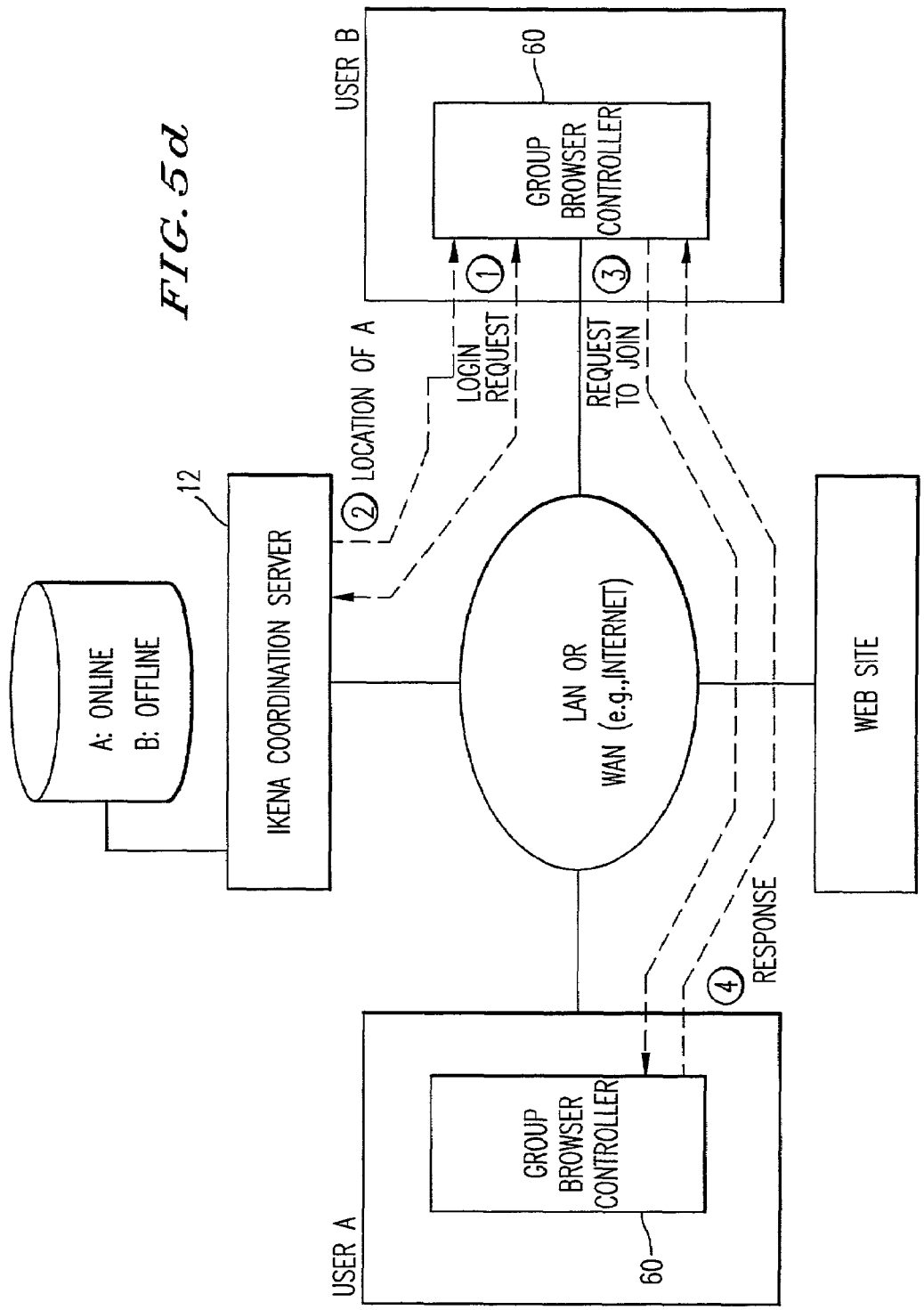

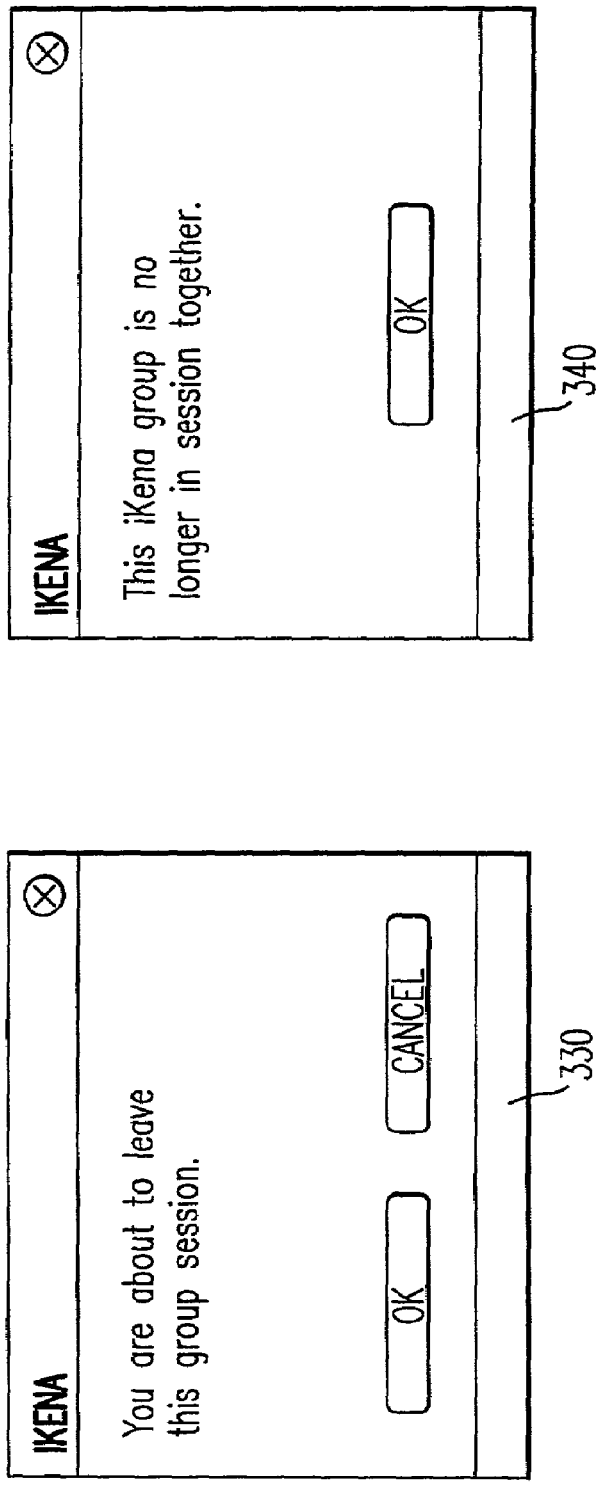

FIG. 11b session_termination

```
void _stdcall CIkenaCobrowseHandler::on_terminate_session( long
 session_id, VARIANT_BOOL b_confirm )
{
  if( b_confirm != VARIANT_FALSE )
  {
    CIkenaConfirmDialog cnf_dlg( IK_INTER_STRING(IDS_SESSION_TE
RMINATE_CONFIRM) );
    if( cnf_dlg.DoModal( m_hwnd_parent ) == IDOK )
    {
      if( m_p_ikena_core != 0 )
      {
        CComPtr<IIkenaPluginHost> p_plugin_host;
        m_p_ikena_core->get_plugin_host(&p_plugin_host);
        if ( p_plugin_host != 0 )
        {
          m_b_confirm_terminate = true;
          p_plugin_host->leave_session( session_id );
        }
      }
    }
  }
  else
  {
    IKENANOTIFYHANDLER->show_notify_message( IK_INTER_STRING(ID
S_SESSION_TERMINATE_NOTIFY) );
  }
} void _stdcall CIkenaCobrowseHandler::on_session_terminate( long
 session_id )
{
  if( m_p_chat_dlg )
  {
    m_p_chat_dlg->end(IDCANCEL);
    m_p_chat_dlg = 0;
  } if ( !m_b_confirm_terminate )
  {
    IKENANOTIFYHANDLER->show_notify_message_modal( IDS_SESSION_
TERMINATE_NOTIFY );
    m_b_confirm_terminate = false;
  }
}
```

SYSTEM FOR ENABLING MULTIPLE CLIENTS TO INTERACT TOGETHER OVER A NETWORK WITH A SECURE WEB PAGE

CROSS-REFERENCE TO RELATED APPLICATIONS

This application is related to and claims priority to U.S. Provisional Patent Application Ser. No. 60/180,589, filed Feb. 7, 2000. The contents of that application are incorporated herein by reference.

BACKGROUND OF THE INVENTION

1. Field of the Invention

The present invention generally relates to an internet group-browsing system that allows multiple users to interact with web pages together.

2. Discussion of the Background

Internet users typically use a web-browser to "surf" the Internet. A browser is a special-purpose application program that effects requests of web pages and the display of a requested web page. It allows users to surf the Internet by moving from one World Wide Web (WWW) site to another. Information on providing Web services is provided in the following references which are incorporated herein by reference: (1) Visual Studio Core Reference Set, by Microsoft Press, (2) Visual InterDev 6.0: Web Technologies Reference, by Microsoft Press, (3) Professional Active Server Pages 2.0 by Francis et al., published by WROX Press Ltd., (4) Oracle PL/SQL Programming by Scott Urman, Published: March 1996, (5) Hitchhikers Guide to Visual Basic and SQL Server: with CD-ROM, by William Vaughn, Published: May 1997, (6) Using Microsoft SQL Server 6.5 (Special Edition) by Stephen Wynkoop, Published: March 1997, and (7) Advanced PowerBuilder 6 Techniques by Ramesh Chandak.

Each individual who is web-browsing typically interacts individually with a given web site. Therefore, when one individual is web-browsing, other Internet users at remote locations are unable to have the same experience or see what that individual is doing on a requested web site. For example, a person who is shopping on-line via a company's web site is unable to have a remotely located friend shop with him/her.

Web group-browsing allows multiple users to "surf" the Internet together and to experience the same web sites simultaneously by enabling those individuals to scroll through a web site's pages together. For example, two people at remote locations can now shop for clothes together on a company's web site. The shopping experience, however, bears little resemblance to a real world group shopping experience due to several existing technological limitations (e.g., privacy, personalization, and the inability of clients group-browsing together to communicate with each other).

Some web sites enable users to "personalize" or customize web pages on the site by (1) indicating preferences or (2) entering personal information. As a result, such users may be provided with personalized services (e.g., "one click shopping" shopping service currently provided by Amazon.com).

One implementation technique for personalization utilizes cookies. Cookies reside on each user's local computer to be used as personal identifiers sent together with a Uniform Resource Locator (URL) requests. To view a specific web page, a client computer system specifies the URL for that web page in a request. This request is forwarded to the web server that supports that web page. When that web server receives the request, it sends that web page to the client computer system. When the client computer system receives that web page, it typically displays the web page using a browser. Cookies can be classified as "persistent cookies," which are stored on users' hard drives, and "session cookies," which are stored in the memory and are only valid during a particular browsing session. Since cookies enable web sites to display personalized information (e.g., personal preferences, names, addresses, telephone numbers, credit card numbers), it is highly undesirable to allow one user's cookies to be accessed by another user without authorization. As such, personalization impacts privacy.

Different approaches have been taken to deal with personalization and privacy issues. The first approach is to confine all users to group-browse within one or a few sites that integrate group-browsing services, which address all personalization and privacy issues specific to those sites. However, because the group-browsing experience is limited to a few selected and customized sites, this approach is not a generalized service for sharing web-surfing experiences. As such, known group-browsing systems are specific to the web site visited and, as such, users have different group-browsing experiences at different web sites.

The second approach is to prevent users from sharing form data that is sent in a POST command. This approach has been used by Cahoots and SideTalk who designed web tour services. Such POST data is exists in some personalized web pages requiring login or automatic login. Thus, the second approach unduly limits group-browsing because it does not allow group-browsers to access pages/requiring POST data. Furthermore, such services limit group-browsing to a single "in-control" party, decreasing the sense of a shared activity.

The third approach is to place the burden of privacy on the users. If one of the users logs into his or her personalized web page during a group-browsing session, this user will receive a cookie from the web site. This personal cookie will be shared by all users in the same session because they will submit the same URL requests to the web site. The user may not, however, be aware that his personal cookie is being shared. There are two primary shortcomings to this approach. First, the shared cookie becomes a persistent cookie on someone else's computer, allowing other users to access and use the cookie owner's personal information. Second, the personal persistent cookies of other users in the session may be replaced without acknowledgment. With replaced cookies, users will not enjoy the same personalized pages they expected even if they are not in group-browsing sessions.

SUMMARY OF THE INVENTION

Accordingly, one object of the present invention is to allow clients to group-browse without confining the users to sites that integrate group-browsing services.

It is a further object of the present invention to allow group-browsing clients to share personalized web pages without sharing any confidential information.

It is another object of the present invention to allow group-browsing clients to share their personalized web pages without permanently leaving their personal cookies on other users' computers.

It is a further object of the present invention to allow group-browsing clients to shop together, but also to make separate purchases.

Each of the above objects is separate and need not be addressed by every embodiment described herein or every claim. Accordingly, one embodiment addresses at least one of the above objectives by providing a group-browsing system that masks the identity of each client computer to prevent web sites from retrieving any clients actual identification information (e.g., in the form of a cookie) that is not part of a group browsing session. Nonetheless, the group browsing system may create a temporary identifier (e.g., temporary cookie) for use by each client in a group during a group browsing session so that when each such client logs on to a web site the same web page is displayed for all the clients in the group. At the end of a group-browsing session, the temporary identifiers are automatically discarded to prevent any user from returning to the web site while masquerading as another client.

According to one embodiment, the actions of all the clients may be tracked collectively (e.g., for billing purposes).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2C is a schematic illustration of (1) an authentication reply to user B and (2) a notice to all other users that have registered an interest in knowing when user B has logged on;

FIG. 3A is a screenshot of an exemplary dialog box for adding users to the interface of FIG. 2 in response to selecting the add button on the interface of FIG. 2;

FIG. 5A is a screenshot of an exemplary dialog box for inviting one of the users listed in the interface of FIG. 4B to join in a group-browsing session;

FIG. 5D is a schematic illustration of a first user requesting that a second user join a group-browsing session using a hybrid client-server/peer-to-peer model;

FIG. 10 is a screenshot of an exemplary dialog box indicating that a group-browsing session is about to be ended;

FIG. 11A is a screenshot of an exemplary dialog box indicating that group-browsing session has ended;

FIG. 11B is an exemplary code excerpt showing how cookies are handled upon termination of a group browsing session;

DETAILED DESCRIPTION OF THE PREFERRED EMBODIMENT

Figure 1:
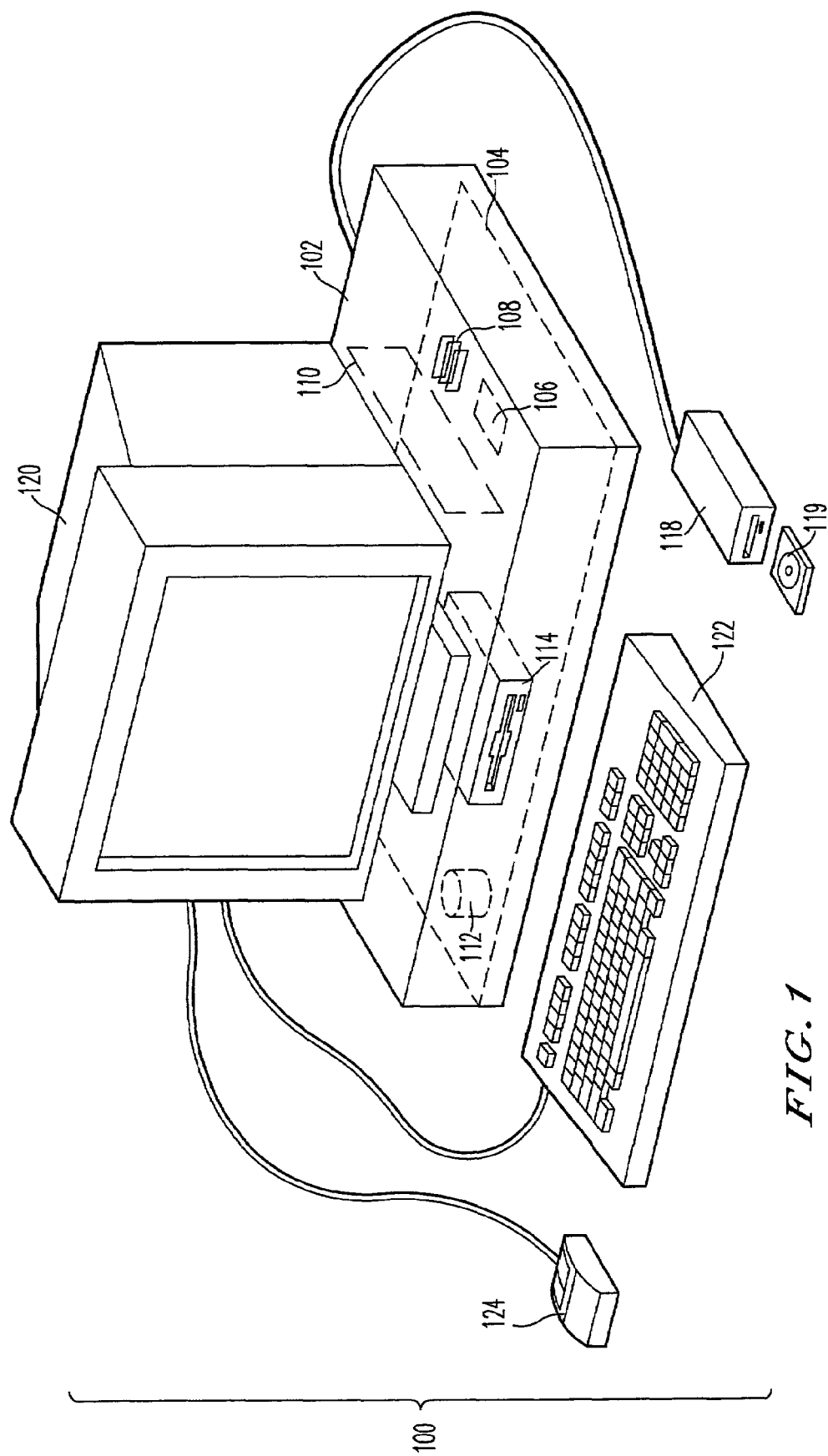
FIG. 1 is a schematic illustration of a computer for implementing either a client-side environment for a group-browsing session or a server-side environment for controlling a group-browsing session or its clients.

Referring now to the drawings, wherein like reference numerals designate identical or corresponding parts throughout the several views, FIG. 1 is a schematic illustration of a computer system for implementing either a client-side environment for a group-browsing session or a server-side environment for controlling a group-browsing session or its clients. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of web sites visited in a group-browsing session.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for implementing either a client-side environment for a group-browsing session or a server-side environment for controlling a group-browsing session or its clients. The computer code devices of the present invention can be any interpreted or executable code mechanism, including but not limited to scripts, interpreters, dynamic link libraries, Java classes, and complete executable programs. Moreover, the computer code devices may be received (e.g., downloaded) dynamically across a Wide Area Network (e.g., the Internet) prior to execution or interpretation. The number of functions performed by any one computer code device is a matter of design choice in light of the teachings herein. For example, the proxy 70, the group browser 65, and the group browser controller 60 (discussed below) may implemented as one or more components in one or more applications. For example, the group browser controller 60 and the proxy 70 may simply be two threads of control within the same program or may be two separate programs. Likewise, the group browser controller 60 or the proxy 70 may be integrated into the group browser 65.

Figure 2D:
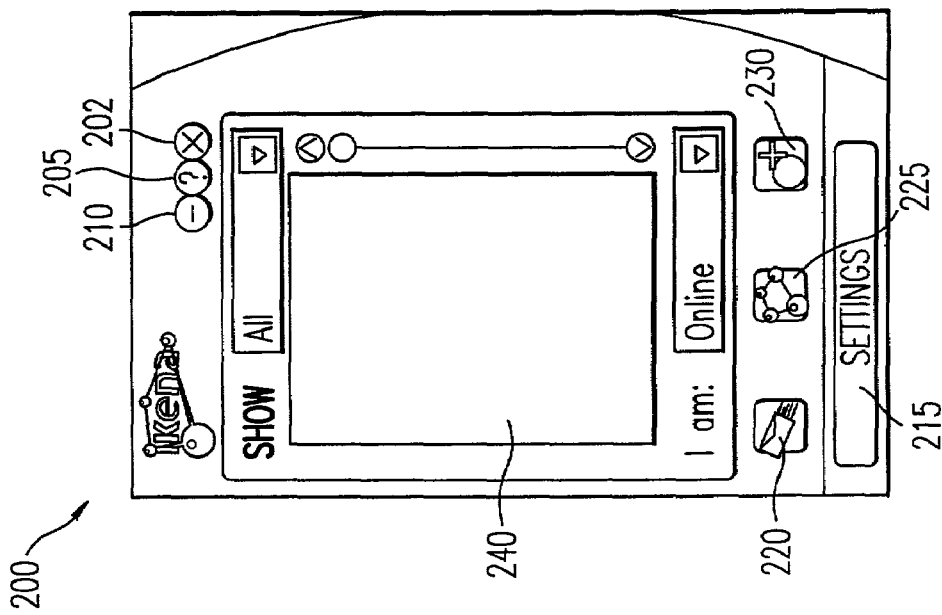
FIG. 2D is a screenshot of an exemplary interface for creating or controlling a client-side environment for a group-browsing session after user authentication.
Figure 2A:
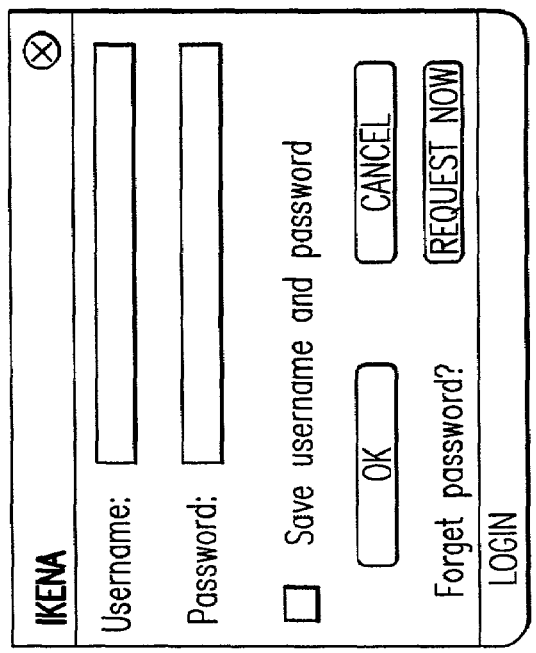
FIG. 2A is a screenshot of an exemplary interface for authenticating a user to a server-side environment for controlling a group-browsing session.

Using at least one computer code device on a client-side computer, a user is prompted to authenticate himself/herself (e.g., using a dialog box as shown in FIG. 2A). In one embodiment, a user sends a username and password to a coordination server 12 (discussed below), where the username and password are compared against entries accessible by the coordination server. Such entries may be stored in files, databases or other data repositories. In an alternate embodiment, tokens or time synchronized control words are utilized for authentication.

Figure 2B:
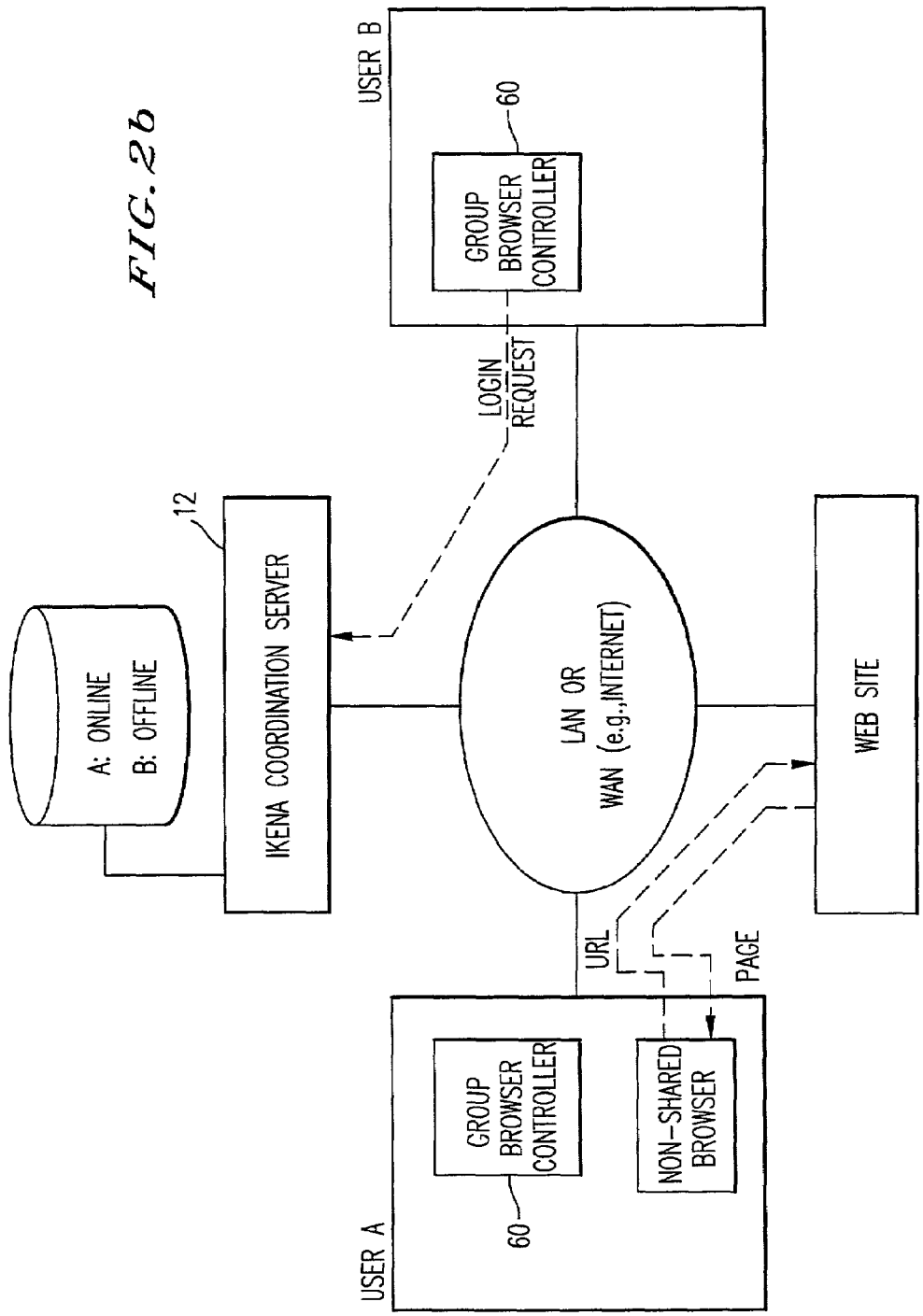
FIG. 2B is a schematic illustration of an authentication request by user B in preparation for a group-browsing session.

As shown in FIG. 2B, a single user (i.e., user A) has been authenticated to the coordination server 12. User A is currently browsing web pages in a non-shared mode since no other users have been authenticated. The non-shared browser has access to all permanent cookies maintained on the system as well as any session cookies generated within the session. Later, user B sends an authentication request to the coordination server 12. As shown in FIG. 2C, if the authentication information is correct, then user B is sent the status of the other users that he/she has requested information on. Contemporaneously, any users that have registered an interest in user A's status a likewise notified. (As would be appreciated by one of ordinary skill in the art, the status information may be pulled by remote users periodically rather than pushed.)

Once user B has been authenticated to the coordination server 12, user B receives back the status of selected group-browsing members. If user B has not requested information any other users, the list is initially empty. An exemplary interface 200 is shown in FIG. 2D. That interface includes a title bar with a close button 202, a help button 205 and a minimization button 210. The interface 200 also includes a settings button 215, a mail button 220, a group-browsing invitation button 225 and a user add button 230 for controlling the interface 200. The interface also includes a scrollable list area 240 for listing other users and the statuses.

Figure 3B:
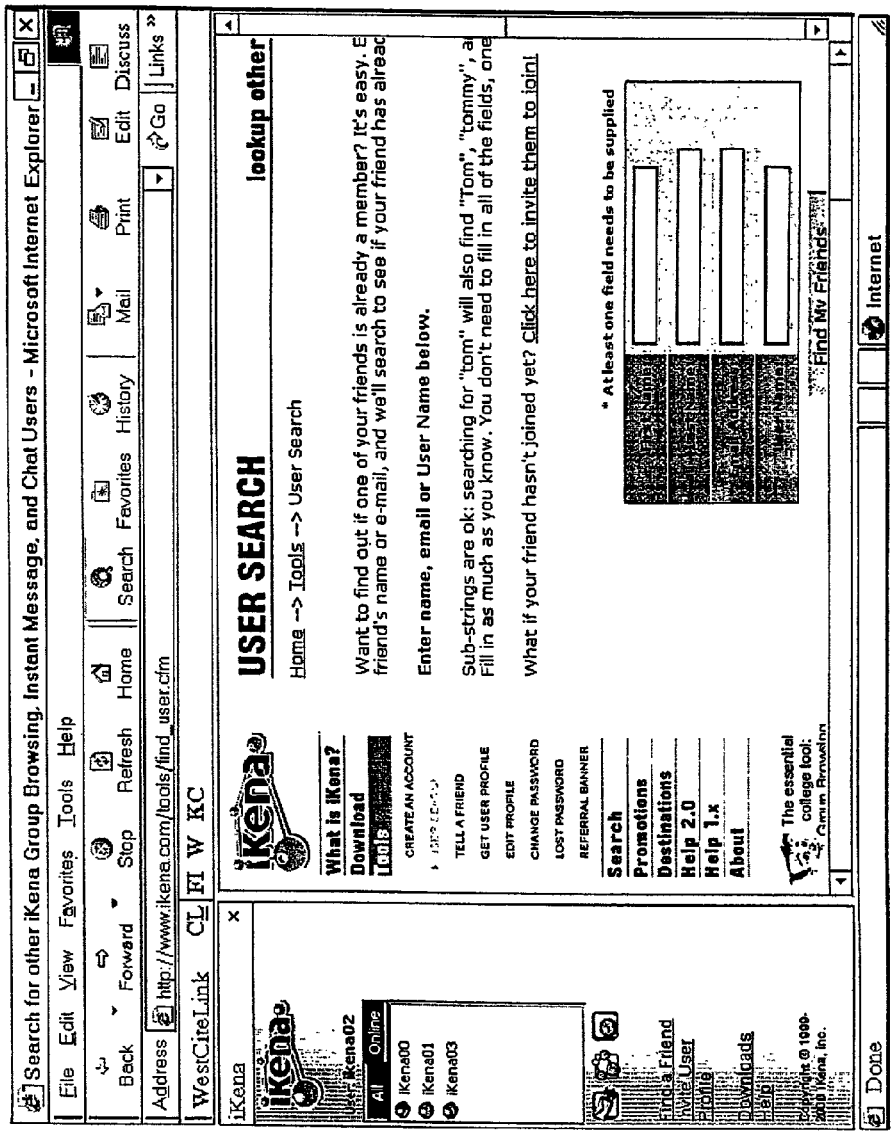
FIG. 3B is a screenshot of an exemplary interface for searching for users in response to selecting the search button on the dialog box of FIG. 3A.

Since the user B cannot group-browse by himself, the user may select the user add button 230 to receive the user add dialog 250 shown in FIG. 3A. The user may either enter a known name in the text entry box, cancel the addition, or search for another user using a separate interface. One embodiment of the search interface is a web page as shown in FIG. 3B. Other search interfaces are also possible (e.g., image searches or voice searches). One such voice search utilizes a computer microphone to couple voice input to a voice recognition unit. The recognition unit may be local or remote (e.g., at the other end of an Internet telephony connection).

Figure 4B:
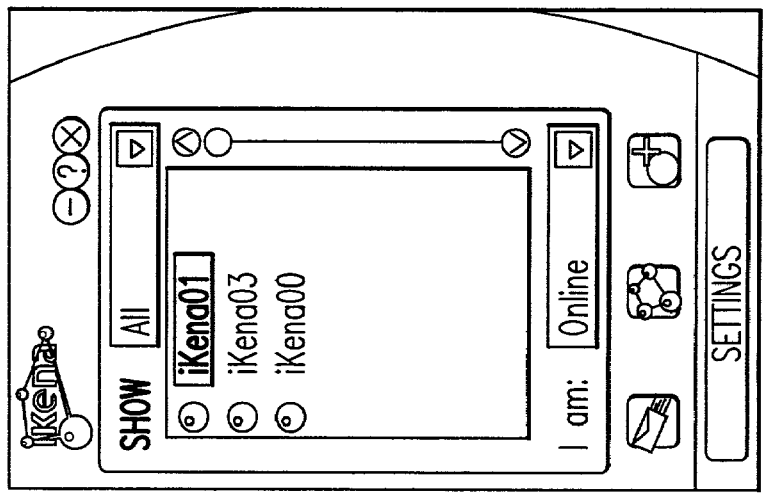
FIGS. 4A and 4B are exemplary screenshots of the interface of FIG. 2 after one and three users have been added, respectively.
Figure 4A:
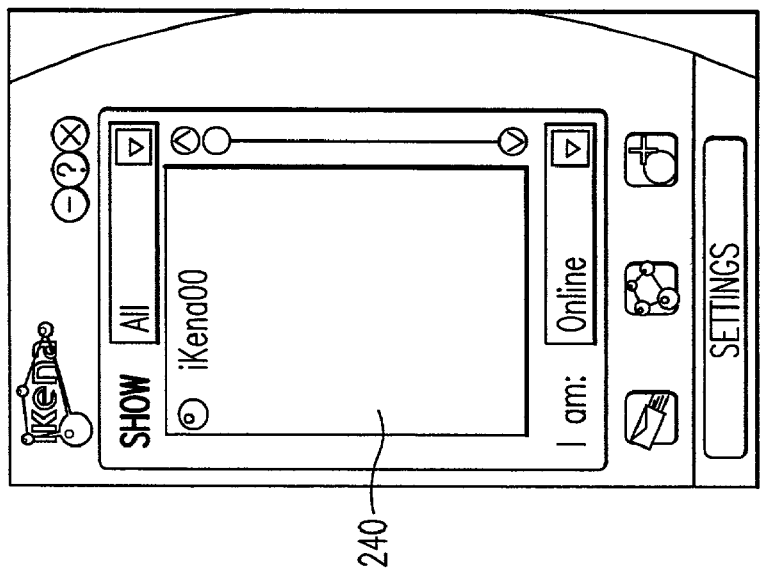

An exemplary result of adding a first user is shown in FIG. 4A. After adding two additional users, and exemplary interface 200 includes three possible users to choose from, as shown in FIG. 4B.

Once users have been added to the interface 200, at least one user may be selected from the list area 240 as shown in FIG. 5A. By then selecting the group-browsing invitation button 225, the users selected in the list 240 may be sent a message (optionally including text) inviting them to join a group-browsing session. Such an invitation may be made using a message dialog 260. In the example, Ikena02 is inviting Ikena01 to a group-browsing session.

Figure 5B:
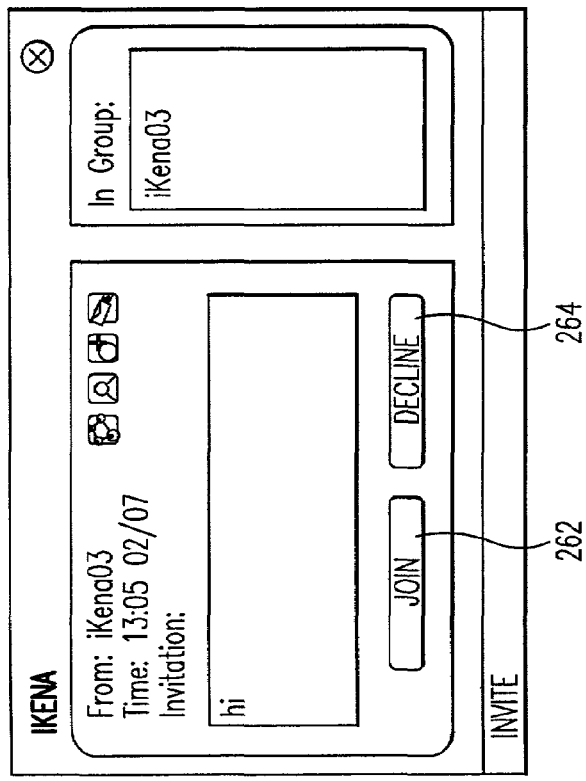
FIG. 5B is a screenshot of an exemplary dialog box for accepting the invitation of another user.
Figure 5C:
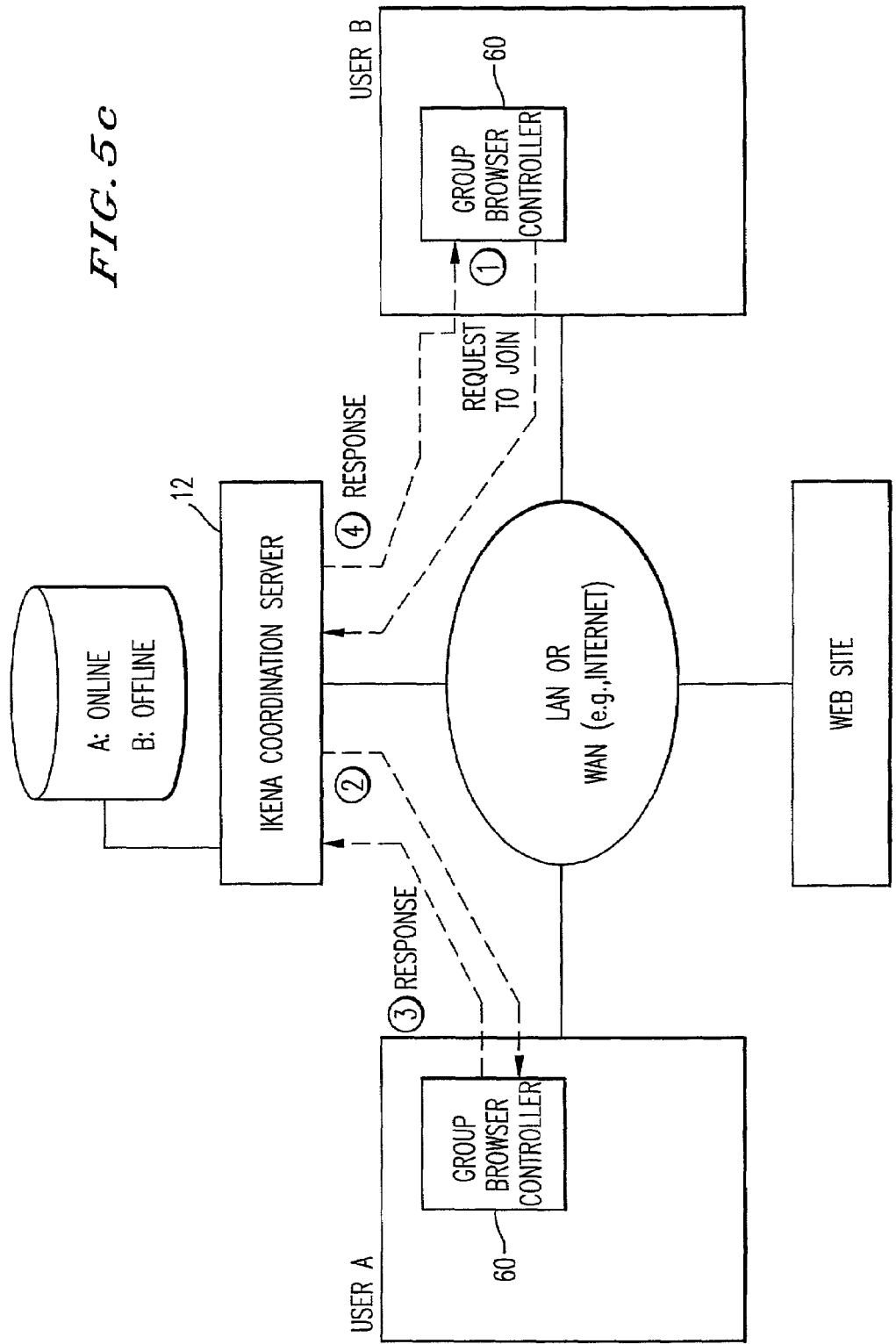
FIG. 5C is a schematic illustration of a first user requesting that a second user join a group-browsing session using a pure client-server model.
Figure 5E:
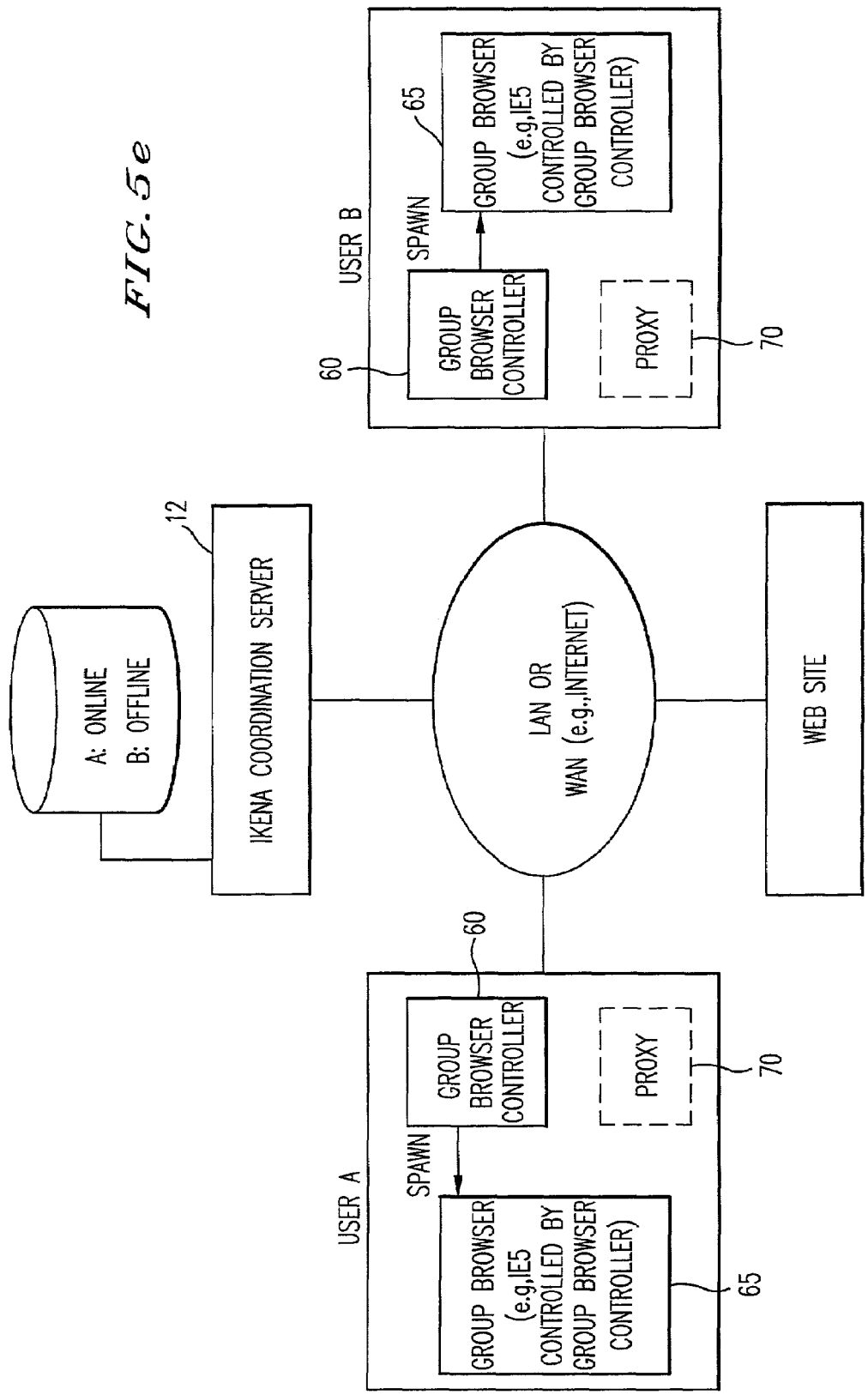
FIG. 5E is a schematic illustration of client-side environments having been spawned as a result of at least two users forming a group-browsing session.

Similarly, as shown in FIG. 5B, user Ikena02 is being invited by user Ikena03 to join in a browsing session. No other users are yet in the group. The user may either join the group using button 262 or decline using button 264. The invitation process is shown schematically in FIG. 5C for a pure client-server model. Instead of passing the "join" request through the coordination server 12, user B may instead request the location of user A and then pass the "join" request directly to user A, as shown in FIG. 5D. In either embodiment, once the join request has been accepted, the group browser controller 60 on each local machine spawns the rest of the client-side environment for group browsing. As shown in FIG. 5E, that environment includes a group browser 65 (e.g., Internet Explorer 5.X). In one embodiment, the environment also includes a proxy 70 that acts as a gatekeeper for preventing personal information from being disclosed in a group-browsing session. Preferably, at the start of a group-browsing session, access to previously stored cookies by the group browser is disabled for the duration of the group-browsing session to avoid having personal information (accessible by the cookies) be distributed to others in the group browsing session. (Non-shared browsers continue to have access to the permanently stored cookies since the URL requests of the non-shared browsers are not passed between users.)

Figure 6A:
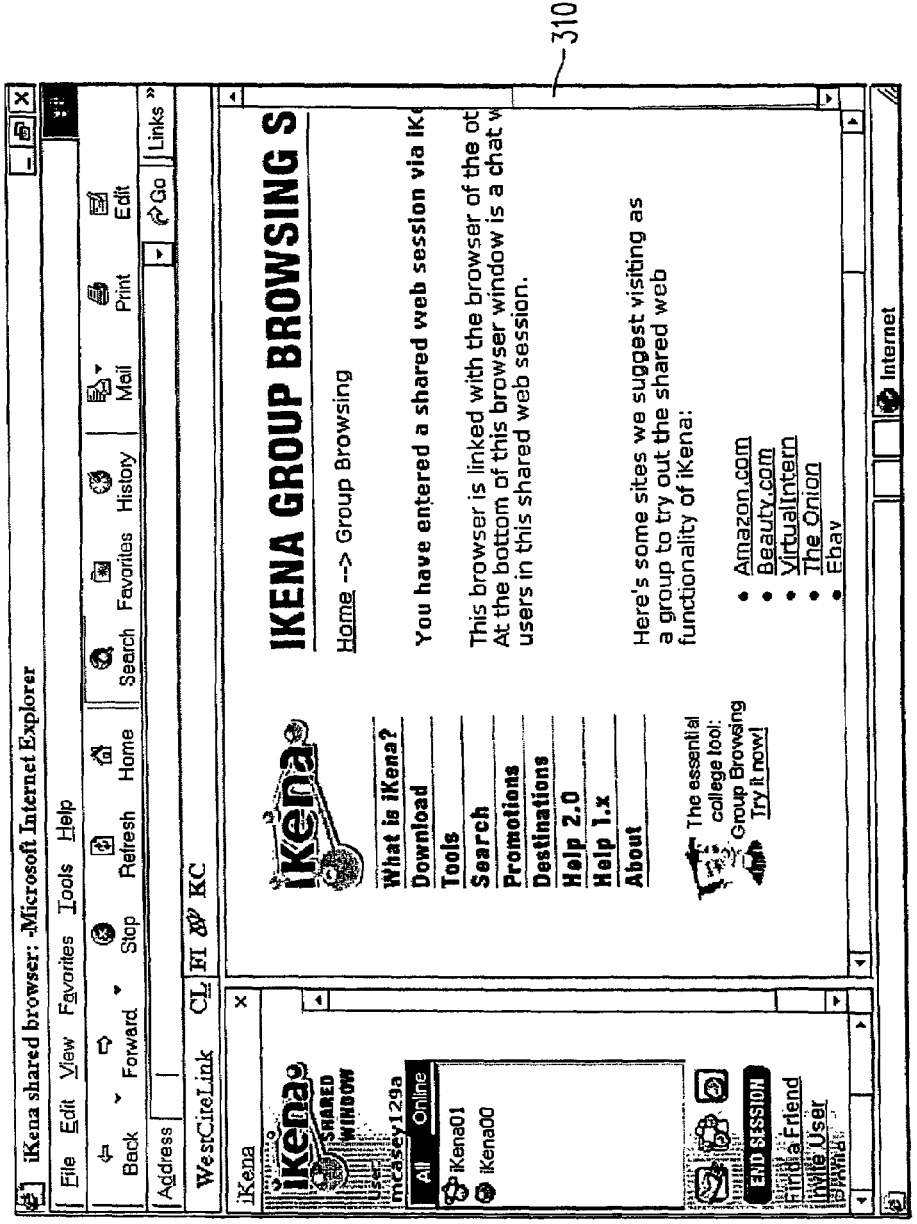
FIGS. 6A and 6B are screenshots of an exemplary three part display that is generated after a user accepts an invitation to begin a group-browsing session.
Figure 6B:
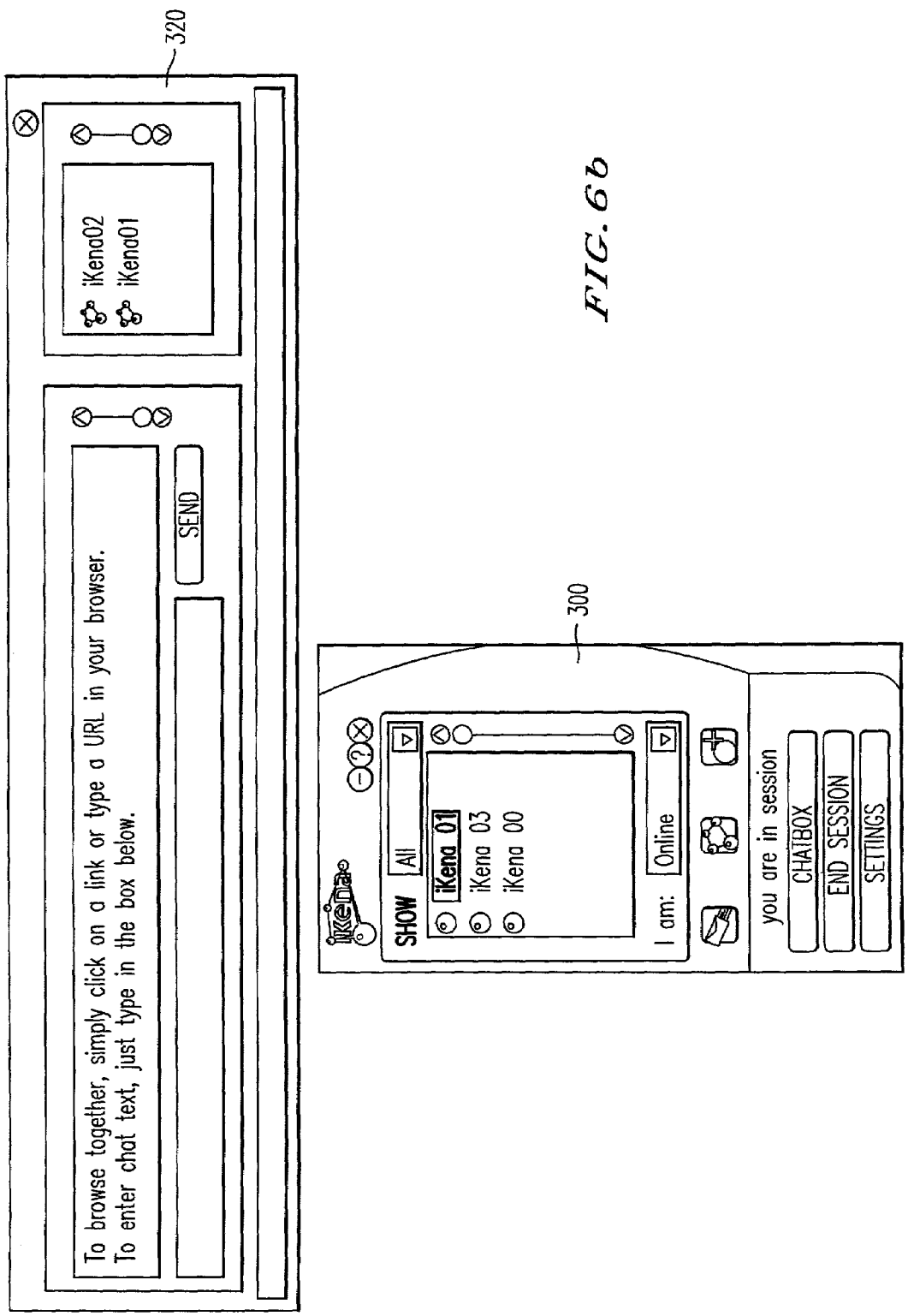

After the client-side environments have been created, a first page shared is displayed by sending messages from the group browser controllers 60 to the group browsers 65. An exemplary display environment is shown in FIG. 6. That environment includes an interface 310 generated by a group browser 65, the interface 200 extended with an on-line toolbar 300, and a chat interface 320 for sending and receiving messages from other members of the group. In one embodiment, the initial page to be displayed is selected by the coordination server and communicated to each of the group browser controllers 60. In another embodiment, the initial page to be displayed is selected by one of the group browser controllers 60 and communicated to the other group browser controllers 60, either directly or via coordination controller 12. Communication between the group browser controllers 60 and the group browsers 65 preferably conforms to the DWebBrowserEvents2 interface and the IwebBrowser2 interface. Those interfaces are published by Microsoft Corporation and are incorporated herein by reference in their entirety.

Figure 7:
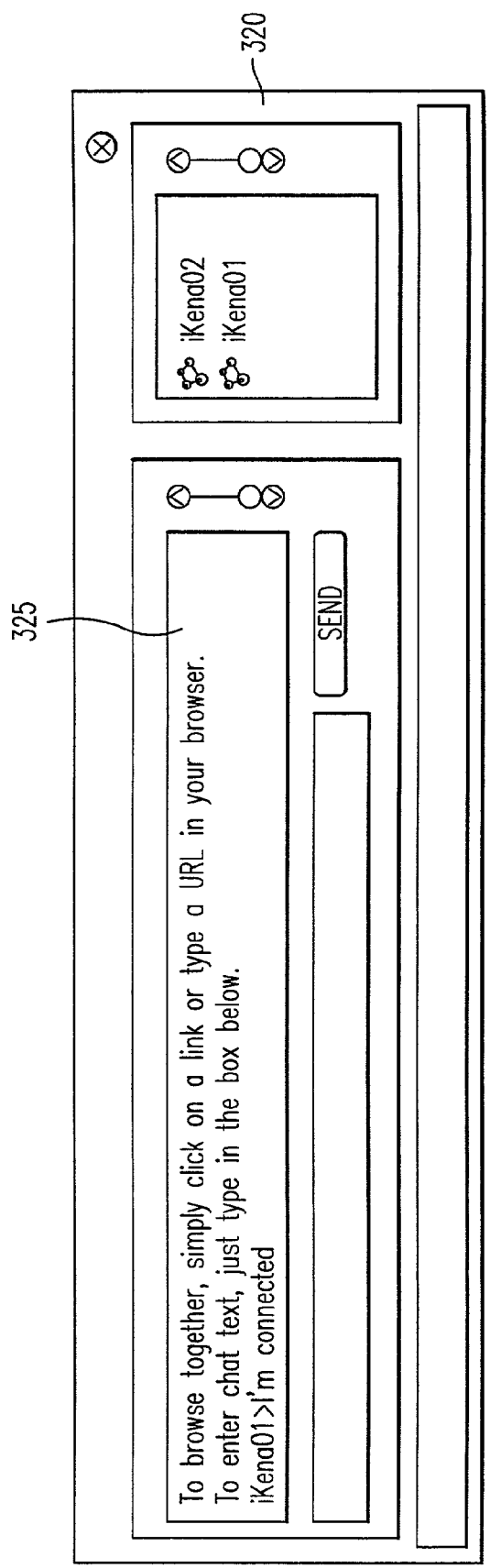
FIG. 7 is a screenshot of an exemplary chat box in which a local user has received a message from a remote user after beginning a group-browsing session.

As shown in FIG. 7, the chat interface 320 can be used to send messages from one user to another. Preferably, the identify of the sending user prefaces the message displayed in the text area 325.

Figure 8A:
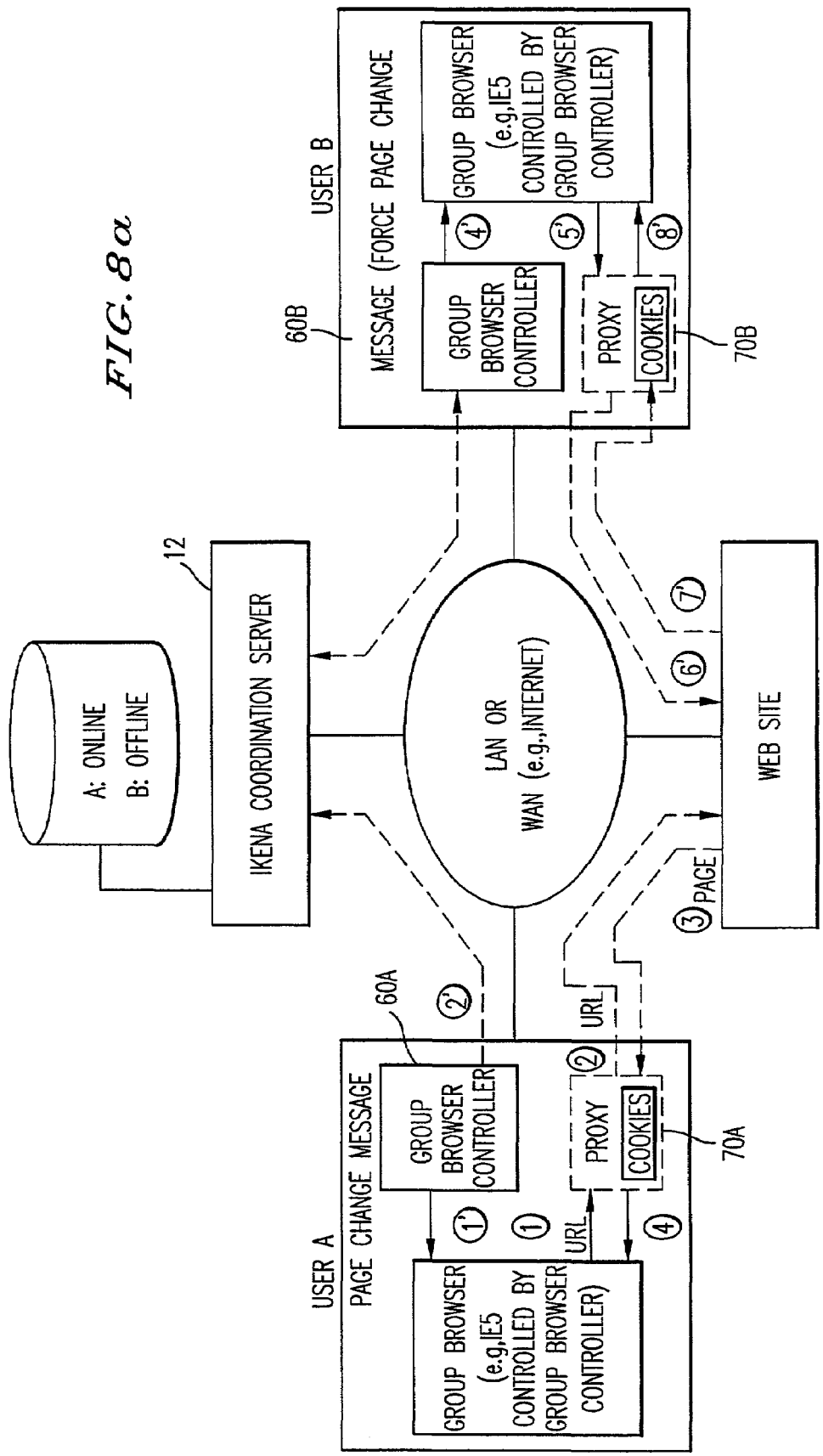
FIG. 8A is a schematic illustration of a request from user A that causes the display of users A and B to be updated.

Once the client-side environments are running, either user may select a navigational control (e.g., the back button, the forward button, the home button, or a history list) or enter an address in the address box to request a group browser 65 to change displayed pages. As shown in FIG. 8A, User A generates selects a new URL to be displayed on the group browser 65. This selection sets off two information exchange sequences (labeled 1–4 and 1'–8', respectively). In the first information exchange, the URL information (including any POST data and cookies) is sent to the group browser controller 60 in the form of a page change message (either before or after the page is actually received according to the second information exchange). As would be understood by one of ordinary skill in the art, if user A is unable to reach the new URL, it may be preferable that the page change message not be sent to the group browser controller 60. On the other hand, in an alternate embodiment, the page change message is sent even if the user A cannot change to the new URL.

In order to distinguish between a locally initiated URL request (1) arriving at a proxy 70A of a user A and a remotely initiated URL request (5') arriving at a proxy 70B of user B, in one embodiment, the group browser controller 60A adds information (e.g., a key/value pair) to the URL information prior to forwarding the URL information to user B. This enables the proxy server 70B to perform cookie management. In an alternate embodiment, the additional information can be added by the group browser 60B upon the arrival of the URL request at user B's machine.

Figure 8B:
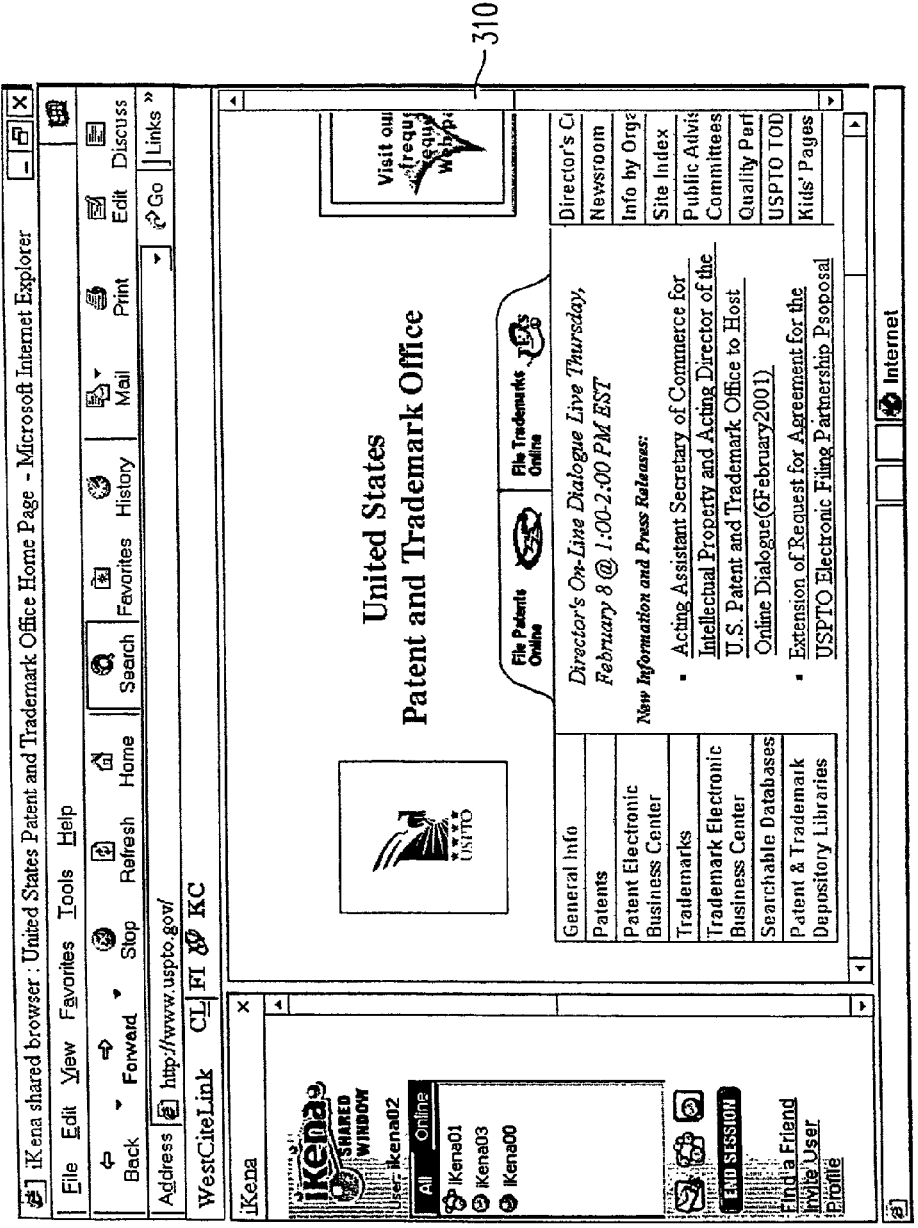
FIGS. 8B and 8C are screenshorts of a result of a request to have the group view a new page.
Figure 8C:
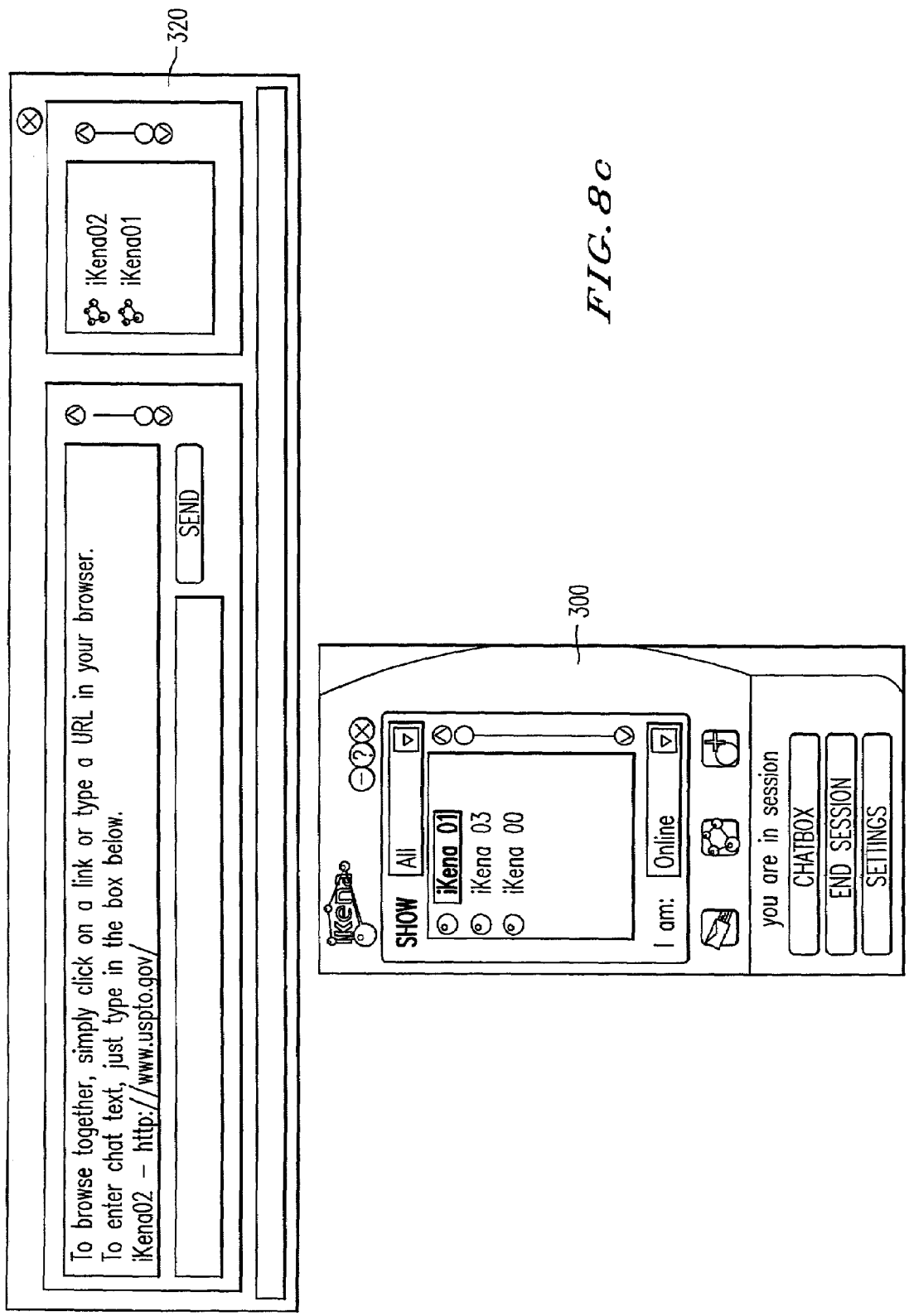

Utilizing the information exchange sequences of FIG. 8A, it is possible to move from the page of FIG. 6 to a new page. FIG. 8B illustrates the result of user A selecting to go to the Patent Office's main page.

Figure 9:
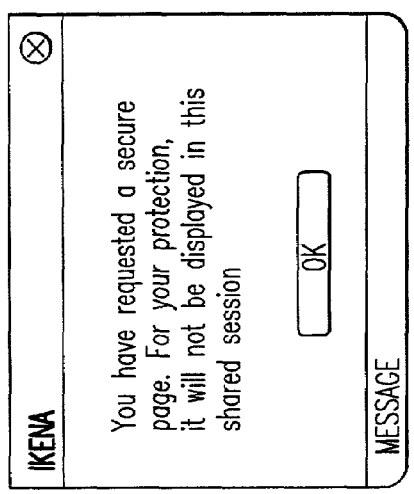
FIG. 9 is a screenshot of an exemplary warning dialog indicating that sensitive data should not be shared.

An important part of the process of FIG. 8A is the transmission of the POST data and cookies between machine. This enables multiple users to browse in an on-line book store, and have the books be added to everyone's cart (because they share a common temporary cookie). The sharing of cookies, however, can be dangerous if the cookies are used to access sensitive information. Often such sensitive information is further protected by utilizing a secure connection (e.g., an https connection) between a browser and a server. Accordingly, in one embodiment of the present invention, attempts to utilize a secure connection are tracked in the proxy 70, and such attempts are blocked for the user's sake. In one such embodiment, a warning message, as shown in FIG. 9, is generated by the proxy and sent back to the browser for display. In such a case, either (1) the group browser controller 60A blocks a page change request message from being sent to the group browser controller 60B or (2) the message is sent but the proxy 70B prevents user B from accessing the page either.

In an alternate embodiment, attempts to access secure content cause a warning message to be sent to the user. That warning identifies the danger of sharing sensitive information and allows the user the opportunity to cancel the request for secure information. In such an embodiment, cookies stored before the start of a group browser session can also be used with the same type of warning.

In yet another embodiment, attempts to access secure content cause a non-shared browser to be spawned on the local machine and future uses of that cookie by other users is prevented via the proxies. Moreover, since a non-shared browser is then used, the information is only displayed to a single user. In this way, a series of users can add items to a shopping cart together, and then one user can perform the checkout while ensuring that the other users do not see the added credit card or personal information.

In the event that a user selects to leave a session (e.g., instead of sharing sensitive data or because a user has selected quit), the present invention gives the user a chance to ensure that is what the user really intended. As shown in FIG. 10, a dialog box 330 notifies the user of the consequences of the action.

As shown in FIG. 11A, other users are notified if a dialog box 340 if the group browsing session has been terminated by one of the users. Since the termination is not reversible, the user is only provided with an okay button. As a result, in an embodiment that utilizes a proxy to maintain cookies, the cookies of the group browsing session must be cleaned up. An exemplary routine for performing cleanup is shown in FIG. 11B.

Figure 12:
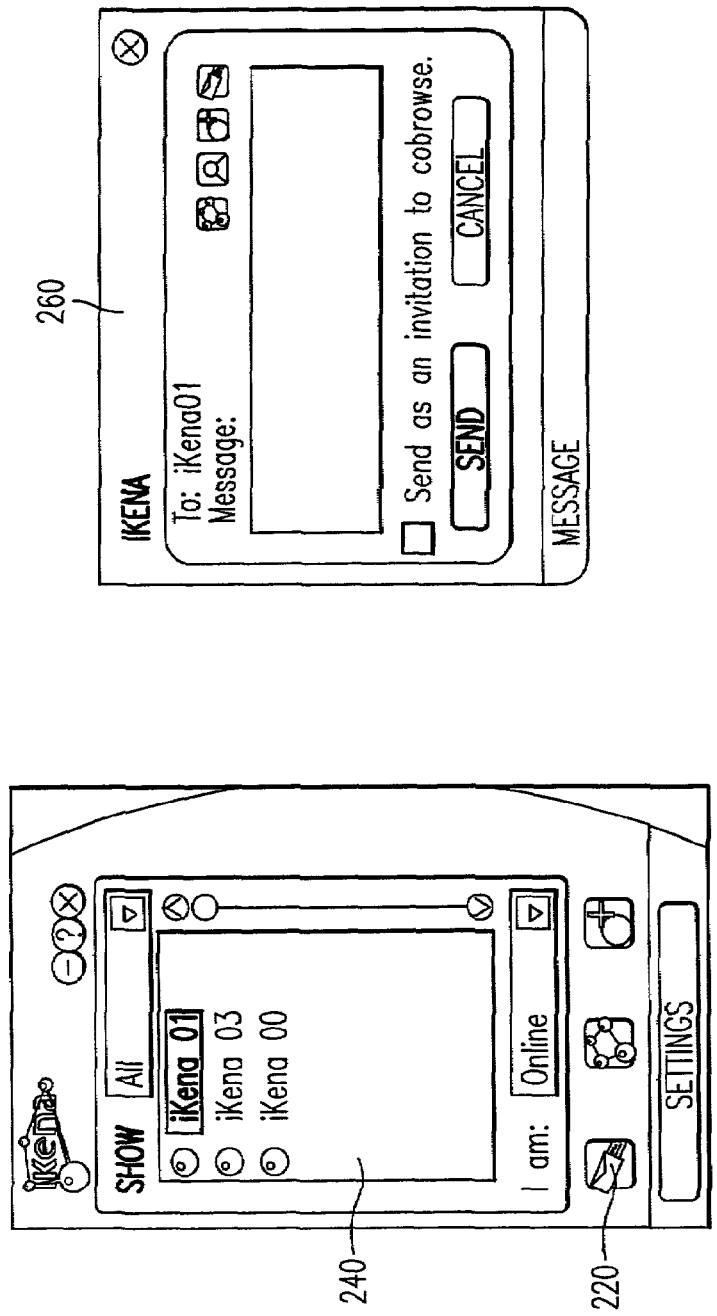
FIG. 12 is a screenshot of an exemplary dialog box for sending messages between users.

It is not always possible or desirable to start a group browsing session just to tell another user something. Accordingly, using the mail button 220, a user may send a message to another user without selecting the "Send as an invitation to cobrowse" checkbox. In such a case, the dialog box 260 is simply used to input a message to be sent to the remote user. As shown in FIG. 12, the user Ikena02 has selected to send a message to Ikena01 using dialog box 260.

Figure 13:
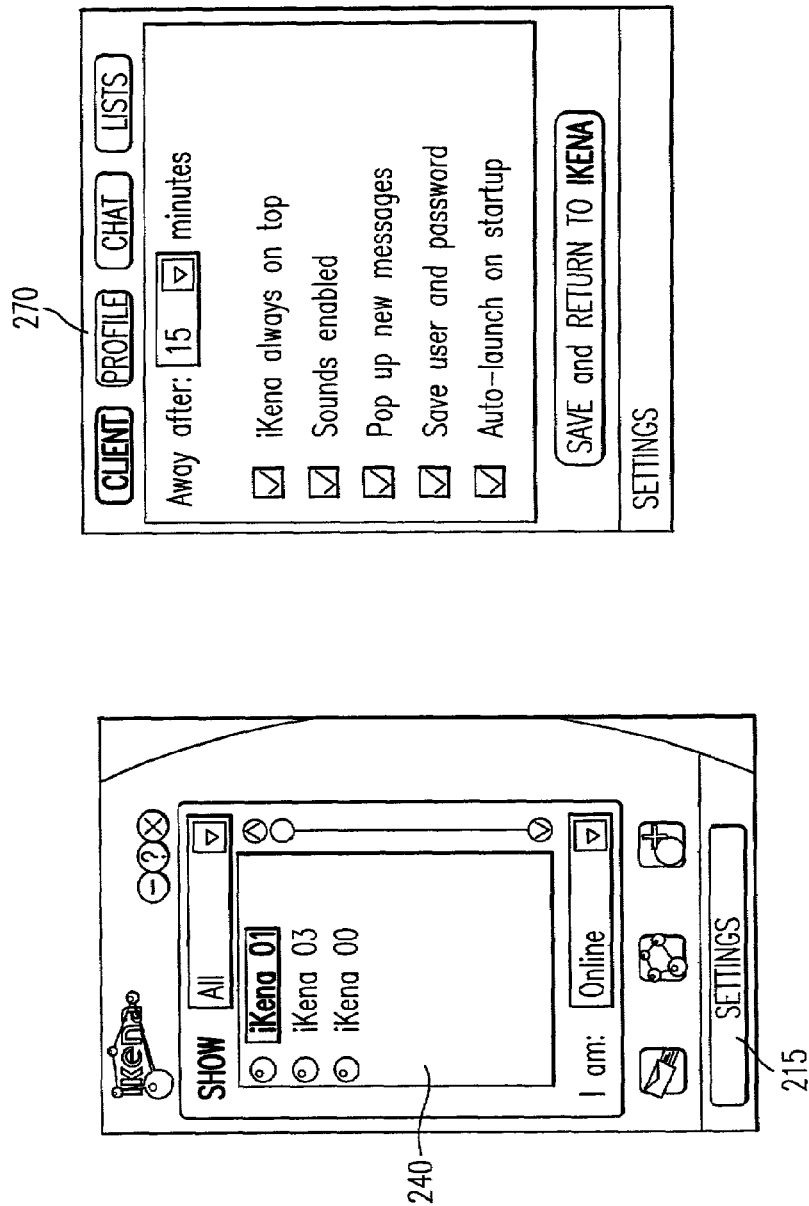
FIGS. 13–16 are exemplary screenshot of configuration dialog boxes.
Figure 14:
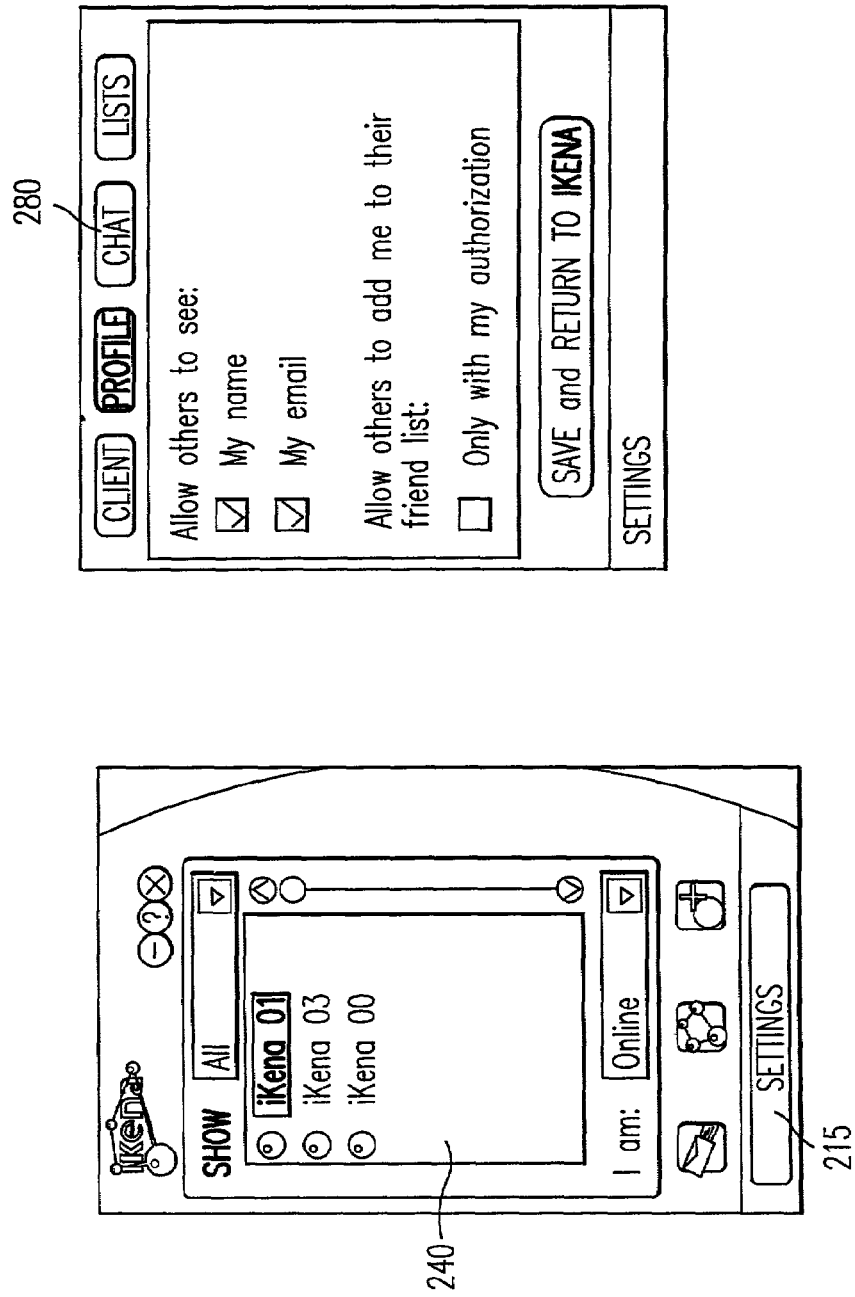
Figure 15:
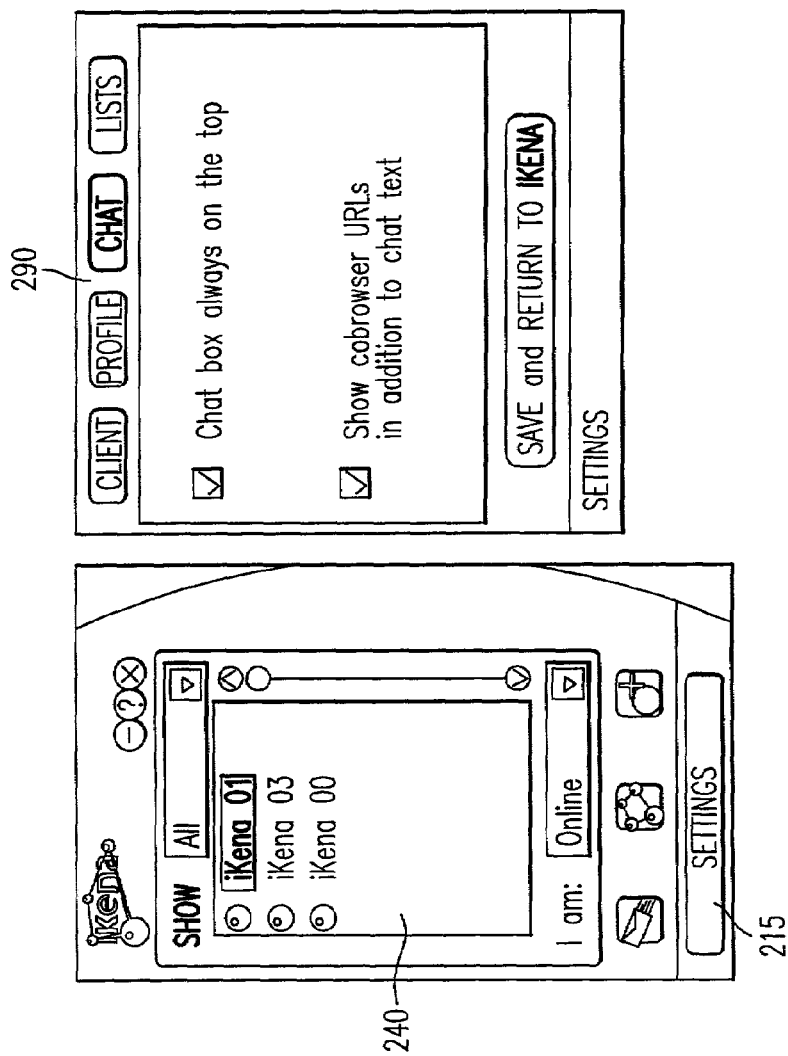
Figure 16:
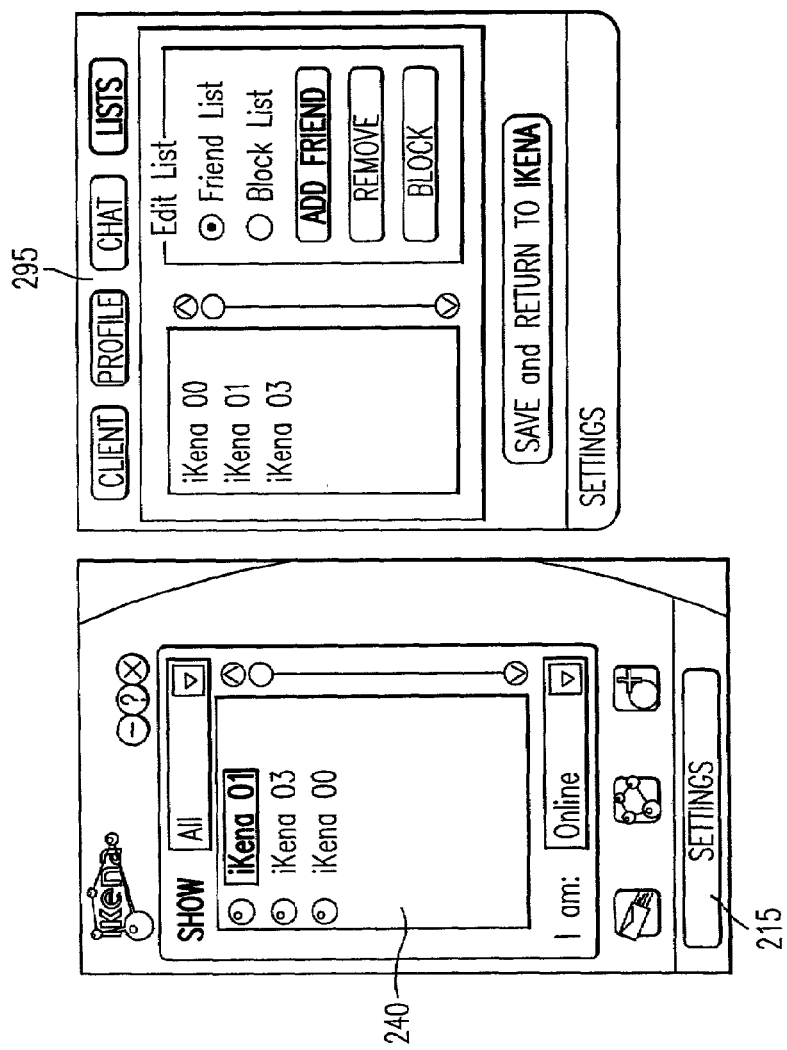

Using the settings button 215, the interface 200 may be configured in various ways. Four exemplary tabs are shown in the dialog box 270 in FIG. 13. The selected tab is the client tab, and the user is enabled to select any of the options illustrated. The user is similarly able to select options displayed in the profile dialog box 280, the chat dialog box 290, and the lists dialog box 295 in FIGS. 14–16, respectively.

Figure 17:
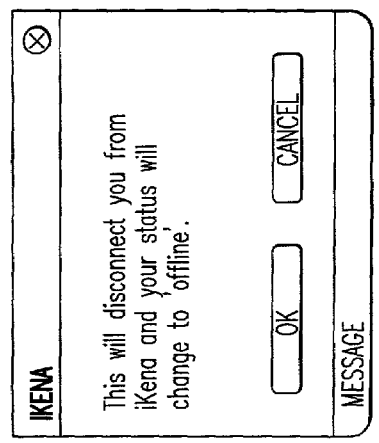
FIG. 17 is a screenshot of an exemplary warning dialog box.

When a user is ready to completely quit the system, rather than just a session, the user is preferably warned of the consequence, as shown in FIG. 17.

As described herein, a portion of the responsibility of the proxy 70 is to manage cookies between the users of a group. Although a group browsing session preferably starts with no cookies, cookies can be added during the group browsing session. According to one embodiment of the present invention, the proxy runs trigger routine computer code to manage cookies. An exemplary trigger routine computer code and cookie manager computer code are attached hereto in Appendix I. This prevents any client's actual identification information (i.e., personal information created before the group browsing session) from being disclosed. Furthermore, the proxies 70A and 70B are configured to create the same temporary identifier for each client when any client logs on to the web site so that the same web page is displayed for all the clients in the group. An exemplary log that is created by the co-browsing routine which manages the cookies containing an example of temporary identifier is attached hereto in Appendix II.

In a pure-client server implementation, the coordination server 12 is capable of tracking all the page transitions and on whose behalf they were made. Thus, the coordination server 12 can perform tracking for billing and other purposes.

In an alternate embodiment, the browser is augmented with a plug-in for specifying a new protocol that will be handled by the plug-in. By specifying that the protocol is "ikena://" instead of "http://", the plug-in can direct URL requests to itself without the need for a separate proxy. In an embodiment that utilizes protocol substitution, the "ikena://" protocol is associated with a well-known port number (e.g., 7165).

This method also includes masking the identity of each client's computer to prevent the web site from retrieving any client's actual identifier by replacing the http protocol identifier with a special protocol identifier. Additionally, the group-browsing method of the subject invention further includes creating the same temporary identifier for each client when any client logs on to the web site so that the same web page is displayed for all the clients in the group.

The group-browsing system of the subject invention also prevents any client, identified as another client, from returning to the web site by deleting the temporary identifier at the end of a group-browsing session. Additionally, when other clients in the group are able to access that client's private information, the system generates a warning message. At the end of a group-browsing session, client software is able to detect the end of a group-browsing session and, in response, to direct a client's secure browser to transmit the web site URL, allowing the client to return to the previously accessed web site.

Figure 18:
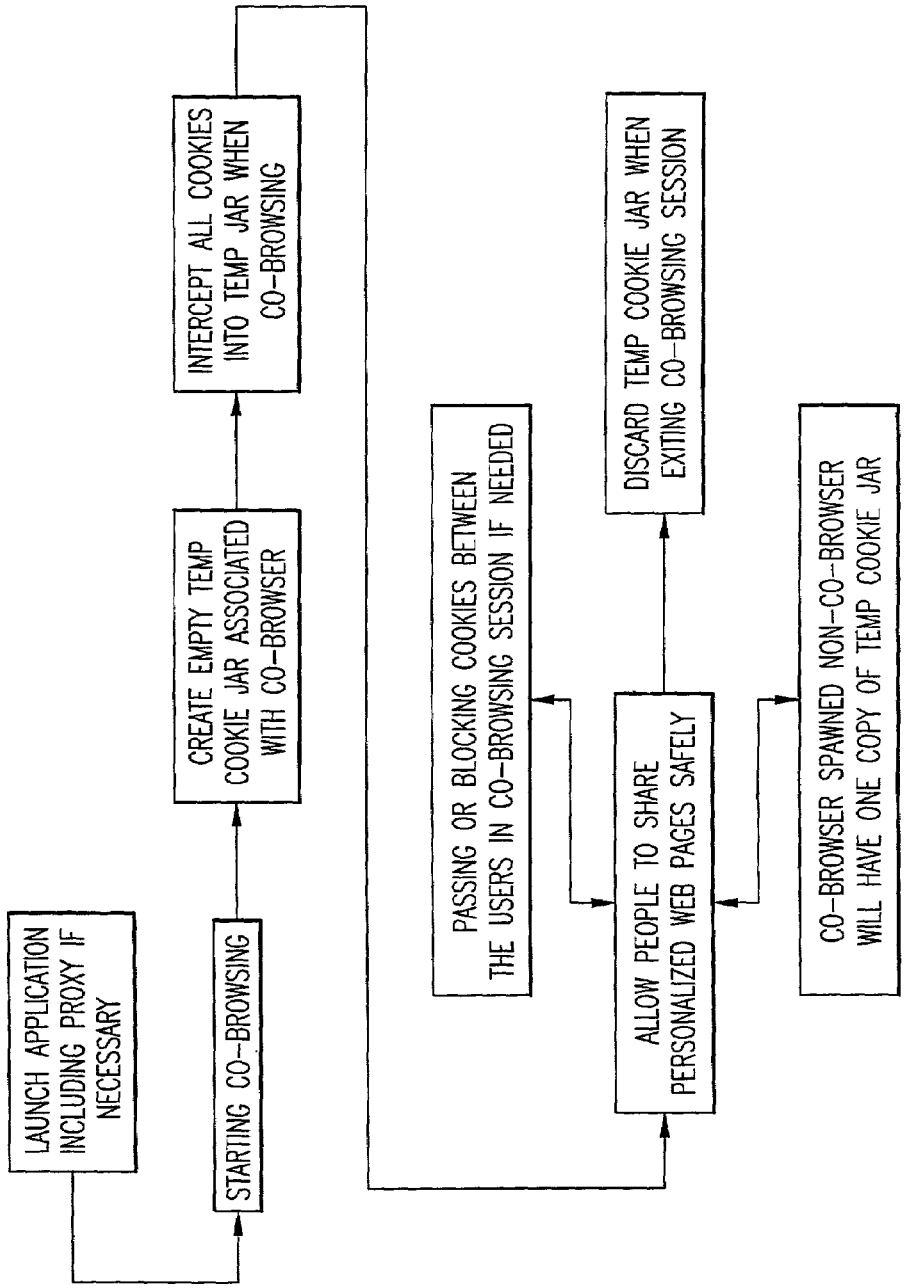
FIG. 18 is a flow diagram of a general operation of a method of the present invention.

The primary steps associated with the gatekeeper module of the system are shown in FIG. 18. In step 662, the gatekeeper launches a software application. In step 664, client A, starts a group-browsing session. In step 666, the software application creates an empty temporary cookie jar associated with group browsers. In step 668, the software application intercepts all cookies and places them into temporary cookie jars. In step 672, the software application allows clients to share personalized web pages safely by passing or blocking cookies between the users in a co-browsing session at step 670.

In step 674, the termination of a session may either allow at least one of the users to continue to use cookies from the group session (but in another, non-shared browser) or all the cookies may be cleaned up.

Additional messages may also be displayed during group-browsing session. Dialog boxes may state, "For your protection, the producer of this site does not allow people to browse this site together due to security and privacy concerns" or, if it is for copyright issues, the dialog box may state, "The producer of this site does not allow group-browsing for copyright protection."

If there are only two clients in a group-browsing session, when client A exits the group-browsing session, the system interrupts client B's experience by logging him off. Client B can then re-log into the web site. However, if there are more than two clients in a group-browsing session, for example three, unless two of the three clients exit the group-browsing session, the system will not interrupt the remaining clients' experience.

The software application of the subject invention consists of two primary components, trigger routine computer code and cookie computer code. Exemplary trigger routine computer code and cookie manager computer code are attached hereto in Appendix I.

One purpose of the trigger routine computer code is to activate the cookie manager routine computer code when a user joins a group-browsing session. The trigger routine computer code accomplishes this task by adjusting the end-user settings to allow the cookie manager routine computer code to intercept all web traffic. Once the session has ended, the trigger routine computer code removes the cookie manager computer code and returns all settings to their previous values.

The cookie manager computer code protects users' personal cookies while allowing them to share personalized web pages and also ensures that those cookies are not improperly transferred to other group-browsing clients; therefore, it establishes a secure group-browsing environment. The cookie manager computer code accomplishes this by creating a temporary cookie jar that houses all cookies created during session. This temporary cookie jar is retained in the memory, and is accessible only by the client's application while group-browsing.

Although specific features of the invention are shown in some drawings and not in others, this is for convenience only, as each feature may be combined with any or all of the other features in accordance with the invention. The words "including," "comprising," "having," and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art. Obviously, numerous modifications and variations of the present invention are possible in light of the above teachings. For example, group-browsing can be performed either client-server or peer to peer (without the coordination server 12 or with only intermittent connectivity thereto). It is therefore to be understood that, within the scope of the appended claims, the invention may be practiced otherwise than as specifically described herein.

APPENDIX I

```
int Browser_Handler::process_request( const char * buffer, ssize_t r_bytes)
{
 m_n_bytes_received += r_bytes;
 if((m_n_bytes_to_receive != 0) &&
    (m_n_bytes_received > (m_n_bytes_to_receive + 2)))
  {
   reset( );
   m_n_bytes_received = r_bytes;
  }
 if ( m_o_request.bypass_parsing( ) == false)
  {
   IKENA_TRACE (DBG_IKPROXY_DUMP, ("Browser_Handler(%x): Dumping raw
incoming data . . . \n", this ));
   IKENA_HEXDUMP( DBG_IKPROXY_DUMP, (buffer, r_bytes ));
   switch ( m_o_request.inject(buffer, r_bytes))
   {
   case IR_COMPLETE:
    if ( m_o_request.parse( ) == PR_ERROR)
    {
```

APPENDIX I-continued

```
    m_response_buf.copy( INVALID_REQUEST_MSG,
INVALID_REQUEST_MSG_LEN);
      send_i( );
      return CONNECTION_CLOSE;
    }
    if ( (strlen(m_o_request.get_request_host( )) == CMD_INFO_VIEW_LEN) &&
        stricmp(m_o_request.get_request_host( ), CMD_INFO_VIEW) == 0)
    {
     create_info_page( );
     return CONNECTION_CLOSE;
    }
    else if ( (strlen(m_o_request.get_request_host( )) == CMD_PURGE_COOKIE_LEN) &&
        stricmp(m_o_request.get_request_host( ), CMD_PURGE_COOKIE) == 0)
    {
     return CONNECTION_CLOSE;
    }
    m_b_shared_session = m_o_request.is_shared_session( );
    if ( m_b_shared_session == true)
    {
     m_o_request.destroy_cookies( );
     m_o_request.set_cookies( m_o_cookie_jar.get_cookies(m_o_request.get_request_host( ),
m_o_request.get_URL( )));
    }
    m_temp_buffer.length(0);
    m_temp_buffer.crunch( );
    m_o_request.compose(m_temp_buffer);
    IKENA_TRACE (DBG_IKPROXY_DUMP, ("Browser_Handler(%x): Dumping parsed
data . . . \n", this ));
    IKENA_HEXDUMP( DBG_IKPROXY_DUMP, (m_temp_buffer.rd_ptr( ),
m_temp_buffer.length( ) ));
    m_web_handler. set_request_host( m_o_request.get_request_host( ));
    m_web_handler. set_request_port( m_o_request.get_request_port( ));
    if ( m_web_handler.start( m_b_shared_session, m_o_request.get_host( ),
m_o_request.get_URL( ), m_o_request.get_port( )) < 0)
    {
     return CONNECTION_CLOSE;
    }
    m_web_handler.inject_request_data( m_temp_buffer.rd_ptr( ), m_temp_buffer.length( ));
    if ( m_o_request.get_body_length( ) > 0)
    {
       m_n_bytes_to_receive = m_o_request.get_body_length( ) +
m_o_request.get_unmodified_header_length( );
       IKENA_TRACE( DBG_IKPROXY, ("Browser_Handler(%x): SET
m_n_bytes to receive = %d . . . \n", this, m_n_bytes_to_receive ));
       ACE_ASSERT( (m_n_bytes_to_receive + 2) >=m_n_bytes_received );
    }
    else
    {
       m_n_bytes_to_receive = m_n_bytes_received = 0;
       IKENA_TRACE( DBG_IKPROXY, ("Browser_Handler(%x): SET
m_n_bytes_to_receive = UNKNOWN . . . \n", this ));
    }
    m_web_handler.send( );
    if ( m_n_bytes_received == m_n_bytes_to_receive)
    {
     reset( );
    }
    break;
   case IR_ERROR:
      m_response_buf.copy( INVALID_REQUEST_MSG,
INVALID_REQUEST_MSG_LEN);
      send_i( );
      return CONNECTION_CLOSE;
    break;
   case IR_INCOMPLETE:
      IKENA_TRACE( DBG_IKPROXY, ("Browser_Handler(%x): Complete header NOT
yet given\n", this ));
     break;
   default:
      ACE_ASSERT(false);
     break;
   }
  }
  else
  {
   IKENA_TRACE( DBG_IKPROXY, ("Browser_Handler(%x): Bypassing parse data . . . \n",
this ));
    if ( m_n_bytes_received > (m_n_bytes to_receive + 2))
    {
```

APPENDIX I-continued

```
  ACE_ASSERT( false );
}
else
{
  m_web_handler.inject_request_data( buffer, r_bytes );
}
m_web_handler.send( );
if ( m_n_bytes_received >= m_n_bytes_to_receive)
{
  reset( );
}
}
return CONNECTION_ALIVE;
}
inline void HTTP_Request::destroy_cookies( void )
{
 m_v_cookies.clear( );
 return,
}
inline void HTTP_Request::set_cookies( const vector<HTTP_Cookie> * v_cookies )
{
 if(v_cookies != 0)
 {
  m_v_cookies = *(v_cookies);
 }
 return;
}
```

APPENDIX II w/ cookie management, pay attention to flag "ikena: shared"
(16:39:35) Browser_Handler(391b338)::handle_input[4291038473], r_bytes=644
(16:39:35) Browser_Handler(391b338): Dumping raw incoming data . . .
(16:39:35) Dumping 0x3ClF960 size 644
(16:39:35) 47 45 54 20 68 74 74 70 3A 2F 2F 6D 79 2E 79 61      GET http://my.yahoo.com/
(16:39:35) 68 6F 6F 2E 63 6F 6D 2F 20 48 54 54 50 2F 31 2E      HTTP/1.
(16:39:35) 30 0D 0A 41 63 63 65 70 74 3A 20 69 6D 61 67 65      0..Accept: image/
(16:39:35) 2F 67 69 66 2C 20 69 6D 61 67 65 2F 78 2D 78 62      gif, image/x-
(16:39:35) 69 74 6D 61 70 2C 20 69 6D 61 67 65 2F 6A 70 65      xbitmap, image/jpeg,
(16:39:35) 67 2C 20 69 6D 61 67 65 2F 70 6A 70 65 67 2C 20      image/pjpeg,
(16:39:35) 61 70 70 6C 69 63 61 74 69 6F 6E 2F 76 6E 64 2E      application/vnd.
(16:39:35) 6D 73 2D 70 6F 77 65 72 70 6F 69 6E 74 2C 20 61      ms-powerpoint,
(16:39:35) 70 70 6C 69 63 61 74 69 6F 6E 2F 76 6E 64 2E 6D      application/vnd.
(16:39:35) 73 2D 65 78 63 65 6C 2C 20 61 70 70 6C 69 63 61      ms-excel, applica-
(16:39:35) 74 69 6F 6E 2F 6D 73 77 6F 72 64 2C 20 2A 2F 2A      tion/msword, */*
(16:39:35) 0D 0A 41 63 63 65 70 74 2D 4C 61 6E 67 75 61 67      ..Accept-Language:
(16:39:35) 65 3A 20 65 6E 2D 75 73 0D 0A 69 6B 65 6E 61 3A      en-us..ikena:
(16:39:35) 20 73 68 61 72 65 64 0D 0A 50 72 6F 78 79 2D 43      shared..Proxy-
(16:39:35) 6F 6E 6E 65 63 74 69 6F 6E 3A 20 4B 65 65 70 2D      Connection: Keep-
(16:39:35) 41 6C 69 76 65 0D 0A 55 73 65 72 2D 41 67 65 6E      Alive..User-Agent:
(16:39:35) 74 3A 20 4D 6F 7A 69 6C 6C 61 2F 34 2E 30 20 28      Mozilla/4.0 (
(16:39:35) 63 6F 6D 70 61 74 69 62 6C 65 3B 20 4D 53 49 45      compatible; MSIE
(16:39:35) 20 35 2E 35 3B 20 57 69 6E 64 6F 77 73 20 39 38      5.5; Windows98..
(16:39:35) 29 0D 0A 48 6F 73 74 3A 20 6D 79 2E 79 61 68 6F      Host: my.yahoo.com..
(16:39:35) 6F 2E 63 6F 6D 0D 0A 43 6F 6F 6B 69 65 3A 20 42      Cookie: B=
(16:39:35) 3D 33 75 6A 38 76 31 70 6B 6E 34 6F 75 72 3B 20      3uj8vlpkn4our;
(16:39:35) 49 3D 69 31 3D 31 75 31 76 32 32 32 36 32 39 32      I=i1=1u1v2226292
(16:39:35) 70 34 37 34 39 34 67 34 75 35 35 37 31 37 61 37      p47494g4u55717a7
(16:39:35) 64 61 30 61 63 61 64 62 30 62 33 62 64 62 70 63      da0acadb0b3bdbpc
(16:39:35) 30 63 31 63 67 63 6F 63 70 69 62 26 69 72 3D 37      0c1cgcocpib&ir=7
(16:39:35) 38 3B 20 59 3D 76 3D 31 26 6E 3D 39 38 74 70 6E      8; Y=v=1&n=98tpn
(16:39:35) 74 30 37 75 30 31 6F 30 26 6C 3D 32 37 34 64 36      t07u01o0&l=274d6
(16:39:35) 5F 70 37 30 64 36 2F 6F 26 70 3D 6D 32 64 30 31      _p70d6/o&p=m2d01
(16:39:35) 6F 39 34 31 30 30 62 30 34 26 72 3D 32 34 26 6C      o94100b04&r=24&l
(16:39:35) 67 3D 75 73 26 69 6E 74 6C 3D 75 73 3B 20 54 3D      g=us&intl=us; T=
(16:39:35) 7A 3D 54 68 77 66 36 41 54 6E 46 67 36 41 69 4E      z=Thwf6ATnFg6AiN
(16:39:35) 75 5A 68 32 2F 65 6F 63 45 4E 6A 63 33 42 6A 59      uZh2/eocENjc3BjY
(16:39:35) 7A 4E 7A 5A 50 4D 54 63 7A 4D 67 2D 2D 26 61 3D      zNzZPMTczMg--&a=
(16:39:35) 67 45 45 26 73 6B 3D 44 41 41 35 4F 36 30 4D 47      gEE&sk=DAA5O60MG
(16:39:35) 4F 53 6F 46 78 26 64 3D 63 32 77 42 54 56 52 42      OsoFx&d=c2wBTVRB
(16:39:35) 64 30 46 55 52 54 42 4E 52 45 55 30 54 6D 70 42      d0FURTBNREU0TmpB
(16:39:35) 4D 45 35 52 4C 53 30 42 59 51 46 6E 52 55 55 42      ME5RLS0BYQFnRUUB
(16:39:35) 61 57 63 42 61 55 46 56 65 6B 46 42 41 58 70 36      aWcBaUFVekFBAXp6
(16:39:35) 41 56 52 6F 64 32 59 32 51 57 64 58 51 51 2D 2D      AVRod2Y2QWdXQQ--
(16:39:35) 0D 0A 0D 0A                                          . . .
(16:39:35) Dumped 0x3C1FBE4 done 644

APPENDIX II-continued

| | |
|---|---|
| (16:39:35) Browser_Handler(391b338): Dumping parsed data . . . | |
| (16:39:35) Dumping 0x392BC54 size 289 | |
| (16:39:35) 47 45 54 20 2F 20 48 54 54 50 2F 31 2E 30 0D 0A | GET/HTTP/1.0.. |
| (16:39:35) 41 63 63 65 70 74 3A 20 69 6D 61 67 65 2F 67 69 | Accept: image/gif, |
| (16:39:35) 66 2C 20 69 6D 61 67 65 2F 78 2D 78 62 69 74 6D | image/x-xbitmap, |
| (16:39:35) 61 70 2C 20 69 6D 61 67 65 2F 6A 70 65 67 2C 20 | image/jpeg, |
| (16:39:35) 69 6D 61 67 65 2F 70 6A 70 65 67 2C 20 61 70 70 | image/pjpeg, app- |
| (16:39:35) 6C 69 63 61 74 69 6F 6E 2F 76 6E 64 2E 6D 73 2D | lication/vnd.ms- |
| (16:39:35) 70 6F 77 65 72 70 6F 69 6E 74 2C 20 61 70 70 6C | powerpoint, appli- |
| (16:39:35) 69 63 61 74 69 6F 6E 2F 76 6E 64 2E 6D 73 2D 65 | cation/vnd.ms- |
| (16:39:35) 78 63 65 6C 2C 20 61 70 70 6C 69 63 61 74 69 6F | excel, application/ |
| (16:39:35) 6E 2F 6D 73 77 6F 72 64 2C 20 2A 2F 2A 0D 0A 41 | msword, */*.. |
| (16:39:35) 63 63 65 70 74 2D 4C 61 6E 67 75 61 67 65 3A 20 | Accept-Language: |
| (16:39:35) 65 6E 2D 75 73 0D 0A 43 6F 6E 6E 65 63 74 69 6F | en-us..Connection: |
| (16:39:35) 6E 3A 20 4B 65 65 70 2D 41 6C 69 76 65 0D 0A 55 | Keep.Alive.. |
| (16:39:35) 73 65 72 2D 41 67 65 6E 74 3A 20 4D 6F 7A 69 6C | User-Agent: Mozilla/ |
| (16:39:35) 6C 61 2F 34 2E 30 20 28 63 6F 6D 70 61 74 69 62 | 4.0 (compatible; |
| (16:39:35) 6C 65 3B 20 4D 53 49 45 20 35 2E 35 3B 20 57 69 | MSIE 5.5; Win- |
| (16:39:35) 6E 64 6F 77 73 20 39 38 29 0D 0A 48 6F 73 74 3A | dows 98)..Host: |
| (16:39:35) 20 6D 79 2E 79 61 68 6F 6F 2E 63 6F 6D 0D 0A 0D | my.yahoo.com . . . |
| (16:39:35) 0A | . |
| (16:39:35) Dumped 0x392BD75 done 289 | |
| (16:39:39) Web_Handler(391b3a4)::send_i: Dumping outgoing data=[391f44], size=289 . . . | |
| (16:39:39) Dumping 0x3921f44 size 289 | |
| (16:39:39) 47 45 54 20 2F 20 48 54 54 50 2F 31 2E 30 0D 0A | GET/HTTP/1.0.. |
| (16:39:39) 41 63 63 65 70 74 3A 20 69 6D 61 67 65 2F 67 69 | Accept: image/gif, |
| (16:39:39) 66 2C 20 69 6D 61 67 65 2F 78 2D 78 62 69 74 6D | image/x-xbitmap, |
| (16:39:39) 61 70 2C 20 69 6D 61 67 65 2F 6A 70 65 67 2C 20 | image/jpeg, |
| (16:39:39) 69 6D 61 67 65 2F 70 6A 70 65 67 2C 20 61 70 70 | image/pjpeg, app- |
| (16:39:39) 6C 69 63 61 74 69 6F 6E 2F 76 6E 64 2E 6D 73 2D | lication/vnd.ms- |
| (16:39:39) 70 6F 77 65 72 70 6F 69 6E 74 2C 20 61 70 70 6C | powerpoint, app- |
| (16:39:39) 69 63 61 74 69 6F 6E 2F 76 6E 64 2E 6D 73 2D 65 | lication/vnd.ms |
| (16:39:39) 78 63 65 6C 2C 20 61 70 70 6C 69 63 61 74 69 6F | excel, application/ |
| (16:39:39) 6E 2F 6D 73 77 6F 72 64 2C 20 2A 2F 2A 0D 0A 41 | msword, */*.. |
| (16:39:39) 63 63 65 70 74 2D 4C 61 6E 67 75 61 67 65 3A 20 | Accept-Language: |
| (16:39:39) 65 6E 2D 75 73 0D 0A 43 6F 6E 6E 65 63 74 69 6F | en-us..Connection: |
| (16:39:39) 6E 3A 20 4B 65 65 70 2D 41 6C 69 76 65 0D 0A 55 | Keep-Alive.. |
| (16:39:39) 73 65 72 2D 41 67 65 6E 74 3A 20 4D 6F 7A 69 6C | User-Agent: Mozilla/ |
| (16:39:39) 6C 61 2F 34 2E 30 20 28 63 6F 6D 70 61 74 69 62 | 4.0 (compatible; |
| (16:39:39) 6C 65 3B 20 4D 53 49 45 20 35 2E 35 3B 20 57 69 | MSIE 5.5; Win- |
| (16:39:39) 6E 64 6F 77 73 20 39 38 29 0D 0A 48 6F 73 74 3A | dows 98)..Host: |
| (16:39:39) 20 6D 79 2E 79 61 68 6F 6F 2E 63 6F 6D 0D 0A 0D | my.yahoo.com . . . |
| (16:39:39) 0A | . |
| (16:39:39) Dumped 0x3922065 done 289 | |
| (16:39:39) Web_Handler(391b3a4)::handle_input[4291038473], r_bytes = 1024, errno = 6 | |
| (16:39:39) Web_Handler(391b3a4): Dumping raw incoming data=[3c1f960], size=1024 . . . | |
| (16:39:39) Dumping 0x3C1F960 size 1024 | |
| (16:39:39) 48 54 54 50 2F 31 2E 30 20 32 30 30 20 4F 4B 0D | HTTP/1.0 200 OK. |
| (16:39:39) 0A 44 61 74 65 3A 20 4D 6F 6E 2C 20 30 35 20 46 | .Date: Mon, 05 F |
| (16:39:39) 65 62 20 32 30 30 31 20 32 31 3A 33 38 3A 34 34 | eb 2001 21:38:44 |
| (16:39:39) 20 47 4D 54 0D 0A 43 61 63 68 65 2D 43 6F 6E 74 | GMT..Cache-Control: |
| (16:39:39) 72 6F 6C 3A 20 70 72 69 76 61 74 65 0D 0A 43 6F | private..Conn- |
| (16:39:39) 6E 6E 65 63 74 69 6F 6E 3A 20 63 6C 6F 73 65 0D | ection: close. |
| (16:39:39) 0A 43 6F 6E 74 65 6E 74 2D 54 79 70 65 3A 20 74 | .Content-Type: |
| (16:39:39) 65 78 74 2F 68 74 6D 6C 0D 0A 53 65 74 2D 43 6F | text/html..Set- |
| (16:39:39) 6F 6B 69 65 3A 20 42 3D 62 35 6B 37 6F 71 38 74 | Cookie: B=b5k7oq8t |
| (16:39:39) 37 75 37 62 34 26 62 3D 32 3B 20 65 78 70 69 72 | 7u7b4&b=2; expires= |
| (16:39:39) 65 73 3D 54 68 75 2C 20 31 35 20 41 70 72 20 32 | Thu, 15 Apr 2 |
| (16:39:39) 30 31 30 20 32 30 3A 30 30 3A 30 30 20 47 4D 54 | 010 20:00:00 GMT; |
| (16:39:39) 3B 20 70 61 74 68 3D 2F 3B 20 64 6F 6D 61 69 6E | path=/; domain= |
| (16:39:39) 3D 2E 79 61 68 6F 6F 2E 63 6F 6D 0D 0A 0D 0A 3C | .yahoo.com . . . < |
| (16:39:39) 68 74 6D 6C 3E 0A 3C 68 65 61 64 3E 0A 3C 73 74 | html>.<head>.< |
| (16:39:39) 79 6C 65 3E 0A 3C 21 2D 2D 0A 73 75 62 68 65 61 | style>.<!--.subhead |
| (16:39:39) 64 20 7B 20 63 6F 6C 6F 72 3A 3B 20 20 66 6F 6E | {color:; font- |
| (16:39:39) 74 2D 66 61 63 65 3A 41 72 69 61 6C 3B 20 66 6F | face:Arial; fo |
| (16:39:39) 6E 74 2D 73 69 7A 65 3A 2D 31 3B 20 7D 2D 2D 3E | nt-size:-1; }--> |
| (16:39:39) 0A 3C 2F 73 74 79 6C 65 3E 0A 0A 3C 74 69 74 6C | .</style>..<title> |
| (16:39:39) 65 3E 57 65 6C 63 6F 6D 65 20 74 6F 20 4D 79 20 | Welcome to My |
| (16:39:39) 59 61 68 6F 6F 21 3C 2F 74 69 74 6C 65 3E 0A 3C | Yahoo!</title>.< |
| (16:39:39) 2F 68 65 61 64 3E 0A 3C 62 62 6F 64 79 20 62 67 | /bead>.<body bg |
| (16:39:39) 63 6F 6C 6F 72 3D 22 23 66 66 66 66 66 66 22 20 | color="#ffffff" |
| (16:39:39) 6F 6E 4C 6F 61 64 3D 22 69 66 28 64 6F 63 75 6D | onLoad="if(docu- |
| (16:39:39) 65 6E 74 2E 66 6D 20 26 26 20 64 6F 63 75 6D 65 | ment.fm && docu- |
| (16:39:39) 6E 74 2E 66 6D 2E 6C 6F 67 69 6E 29 7B 64 6F 63 | ment.fm.login){doc |
| (16:39:39) 75 6D 65 6E 74 2E 66 6D 2E 6C 6F 67 69 6E 2E 66 | ument.fm.login.f |
| (16:39:39) 6F 63 75 73 28 29 3B 7D 22 3E 0A 0A 3C 73 63 72 | ocus( );}">..<script |
| (16:39:39) 69 70 74 20 6C 61 6E 67 75 61 67 65 3D 6A 61 76 | language=jav |
| (16:39:39) 61 73 63 72 69 70 74 3E 0A 3C 21 2D 2D 0A 76 61 | ascript>.<!--.var |
| (16:39:39) 72 20 72 65 6D 6F 74 65 20 3D 20 6E 75 6C 6C 3B | remote = null; |

APPENDIX II-continued

```
(16:39:39) 0A 66 75 6E 63 74 69 6F 6E 20 72 73 28 6E 2C 75
(16:39:39) 2C 77 2C 68 29 20 7B 0A 72 65 6D 6F 74 65 20 3D
(16:39:39) 20 77 69 6E 64 6F 77 2E 6F 70 65 6E 28 75 2C 20
(16:39:39) 6E 2C 20 27 77 69 64 74 68 3D 27 20 2B 20 77 20
(16:39:39) 2B 20 27 2C 68 65 69 67 68 74 3D 27 20 2B 20 68
(16:39:39) 20 2B 27 2C 72 65 73 69 7A 61 62 6C 65 3D 79 65
(16:39:39) 73 2C 73 63 72 6F 6C 6C 62 61 72 73 3D 79 65 73
(16:39:39) 27 29 3B 0A 69 66 20 28 72 65 6D 6F 74 65 20 21
(16:39:39) 3D 20 6E 75 6C 6C 29 20 7B 0A 69 66 20 28 72 65
(16:39:39) 6D 6F 74 65 2E 6F 70 65 6E 65 72 20 3D 3D 20 6E
(16:39:39) 75 6C 6C 29 0A 72 65 6D 6F 74 65 2E 6F 70 65 6E
(16:39:39) 65 72 20 3D 20 73 65 6C 66 3B 0A 77 69 6E 64 6F
(16:39:39) 77 2E 6E 61 6D 65 20 3D 20 27 6D 79 59 61 68 6F
(16:39:39) 6F 52 6F 6F 74 27 3B 0A 72 65 6D 6F 74 65 2E 6C
(16:39:39) 6F 63 61 74 69 6F 6E 2E 68 72 65 66 20 3D 20 75
(16:39:39) 3B 0A 7D 0A 7D 0A 2F 2F 2D 2D 3E 0A 3C 2F 73 63
(16:39:39) 72 69 70 74 3E 0A 3C 63 65 6E 74 65 72 3E 0A 3C
(16:39:39) 74 61 62 6C 65 20 62 6F 72 64 65 72 3D 30 20 77
(16:39:39) 69 64 74 68 3D 22 31 30 30 25 22 20 63 65 6C 6C
(16:39:39) 73 70 61 63 69 6E 67 3D 30 20 63 65 6C 6C 70 61
(16:39:39) 64 64 69 6E 67 3D 30 3E 3C 74 72 3E 3C 74 64 20
(16:39:39) 77 69 64 74 68 3D 22 31 30 30 25 22 3E 0A 3C 74
(16:39:39) 61 62 6C 65 20 62 6F 72 64 65 72 3D 30 20 77 69
(16:39:39) 64 74 68 3D 31 30 30 25 20 63 65 6C 6C 73 70 61
(16:39:39) 63 69 6E 67 3D 30 20 63 65 6C 6C 70 61 64 64 69
(16:39:39) 6E 67 3D 30 3E 3C 74 72 3E 3C 74 64 20 76 61 6C
(16:39:39) 69 67 6E 3D 6D 69 64 64 6C 65 20 77 69 64 74 68
(16:39:39) 3D 22 31 25 22 3E 3C 41 20 48 52 45 46 3D 22 2F
(16:39:39) 75 70 64 2F 3F 68 74 74 70 3A 2F 2F 6D 79 2E 79
(16:39:39) 61 68 6F 6F 2E 63 6F 6D 2F 22 3E 3C 69 6D 67 20
(16:39:39) 73 72 63 3D 22 68 74 74 70 3A 2F 2F 75 73 2E 69
(16:39:39) 31 2E 79 69 6D 67 2E 63 6F 6D 2F 75 73 2E 79 69
(16:39:39) Dumped 0x3C1FD60 done 1024
(16:39:39) Web__Handler(391b3a4): Dumping parsed data=[3924688], size=925 . . .
(16:39:39) Dumping 0x3924688 size 925
(16:39:39) 48 54 54 50 2F 31 2E 30 20 32 30 30 20 4F 4B 0D
(16:39:39) 0A 44 61 74 65 3A 20 4D 6F 6E 2C 20 30 35 20 46
(16:39:39) 65 62 20 32 30 30 31 20 32 31 3A 33 38 3A 34 34
(16:39:39) 20 47 4D 54 0D 0A 43 61 63 68 65 2D 43 6F 6E 74
(16:39:39) 72 6F 6C 3A 20 70 72 69 76 61 74 65 0D 0A 43 6F
(16:39:39) 6E 6E 65 63 74 69 6F 6E 3A 20 63 6C 6F 73 65 0D
(16:39:39) 0A 43 6F 6E 74 65 6E 74 2D 54 79 70 65 3A 20 74
(16:39:39) 65 78 74 2F 68 74 6D 6C 0D 0A 0D 0A 3C 68 74 6D
(16:39:39) 6C 3E 0A 3C 68 65 61 64 3E 0A 3C 73 74 79 6C 65
(16:39:39) 3E 0A 3C 21 2D 2D 0A 73 75 62 68 65 61 64 20 7B
(16:39:39) 20 63 6F 6C 6F 72 3A 3B 20 20 66 6F 6E 74 2D 66
(16:39:39) 61 63 65 3A 41 72 69 61 6C 3B 20 66 6F 6E 74 2D
(16:39:39) 73 69 7A 65 3A 2D 31 3B 20 7D 2D 2D 3E 0A 3C 2F
(16:39:39) 73 74 79 6C 65 3E 0A 0A 3C 74 69 74 6C 65 3E 57
(16:39:39) 65 6C 63 6F 6D 65 20 74 6F 20 4D 79 20 59 61 68
(16:39:39) 6F 6F 21 3C 2F 74 69 74 6C 65 3E 0A 3C 2F 68 65
(16:39:39) 61 64 3E 0A 3C 62 6F 64 79 20 20 62 67 63 6F 6C
(16:39:39) 6F 72 3D 22 23 66 66 66 66 66 66 22 20 6F 6E 4C
(16:39:39) 6F 61 64 3D 22 69 66 28 64 6F 63 75 6D 65 6E 74
(16:39:39) 2E 66 6D 20 26 26 20 64 6F 63 75 6D 65 6E 74 2E
(16:39:39) 66 6D 2E 6C 6F 67 69 6E 29 7B 64 6F 63 75 6D 65
(16:39:39) 6E 74 2E 66 6D 2E 6C 6F 67 69 6E 2E 66 6F 63 75
(16:39:39) 73 28 29 3B 7D 22 3E 0A 0A 3C 73 63 72 69 70 74
(16:39:39) 20 6C 61 6E 67 75 61 67 65 3D 6A 61 76 61 73 63
(16:39:39) 72 69 70 74 3E 0A 3C 21 2D 2D 0A 76 61 72 20 72
(16:39:39) 65 6D 6F 74 65 20 3D 20 6E 75 6C 6C 3B 0A 66 75
(16:39:39) 6E 63 74 69 6F 6E 20 72 73 28 6E 2C 75 2C 77 2C
(16:39:39) 68 29 20 7B 0A 72 65 6D 6F 74 65 20 3D 20 77 69
(16:39:39) 6E 64 6F 77 2E 6F 70 65 6E 28 75 2C 20 6E 2C 20
(16:39:39) 27 77 69 64 74 68 3D 27 20 2B 20 77 20 2B 20 27
(16:39:39) 2C 68 65 69 67 68 74 3D 27 20 2B 20 68 20 2B 20
(16:39:39) 27 2C 72 65 73 69 7A 61 62 6C 65 3D 79 65 73 2C 73
(16:39:39) 63 72 6F 6C 6C 62 61 72 73 3D 79 65 73 27 29 3B
(16:39:39) 0A 69 66 20 28 72 65 6D 6F 74 65 20 21 3D 20 6E
(16:39:39) 75 6C 6C 29 20 7B 0A 69 66 20 28 72 65 6D 6F 74
(16:39:39) 65 2E 6F 70 65 6E 65 72 20 3D 3D 20 6E 75 6C 6C
(16:39:39) 29 0A 72 65 6D 6F 74 65 2E 6F 70 65 6E 65 72 20
(16:39:39) 3D 20 73 65 6C 66 3B 0A 77 69 6E 64 6F 77 2E 6E
(16:39:39) 61 6D 65 20 3D 20 27 6D 79 59 61 68 6F 6F 52 6F
(16:39:39) 6F 74 27 3B 0A 72 65 6D 6F 74 65 2E 6C 6F 63 61
(16:39:39) 74 69 6F 6E 2E 68 72 65 66 20 3D 20 75 3B 0A 7D
(16:39:39) 0A 7D 0A 2F 2F 2D 2D 3E 0A 3C 2F 73 63 72 69 70
(16:39:39) 74 3E 0A 3C 63 65 6E 74 65 72 3E 0A 3C 74 61 62
(16:39:39) 6C 65 20 62 6F 72 64 65 72 3D 30 20 77 69 64 74
```

.function rs(n,u, w,h) {.remote = window.open(u, n, 'width=' + w + ',height=' + h +',resizable=yes, scrollbars=yes ');.if (remote ! = null) {.if(re- mote.opener == null).remote.open er = self;.window. name = 'myYahoo Root';.remote. location.href = u .{.{.//-->.</; script>.<center>.< table border=0 width="100%"cell spacing=0 cell padding=0><tr><td width="100%">.< table border=0 width=100% cell- spacing=0 cellpad- ding=0><tr><td valign=middle width ="1%"><A HREF="/ upd/?http://my. yahoo.com/"><img src="http://us.i 1.yimg.com/us.yi HTTP/1.0 200 OK. .Date: Mon, 05 F eb 2001 21:38:44 GMT..Cache-Cont- rol: private..Conn- ection: close. .Content-Type: text/html . . . <html>. <head>.<style >.<!--.subhead { color:; font- face:Arial; font- size:-1; }-->.</ style>..<title> Welcome to My Yahoo !</title>.</he ad>.<body bgcolor= "#ffffff"on Load="if(document .fm && document. fm.login) {document. fm.login.focus ( );}">..<script language=java script>.<!--.var remote =null;.fun- ction rs(n,u,w, h) {.remote = win- dow.open(u, n, 'width=' + w + ', height='+ h +', resizable=yes, scrollbars=yes'); .if (remote!= null) {.if(remote. opener == null) .remote.opener =self;.window. name = 'myYahooRoot'; .remote.loca- tion.href = u;.} .}.//-->.</script> .<center>.

APPENDIX II-continued

```
(16:39:39) 68 3D 22 31 30 30 25 22 20 63 65 6C 6C 73 70 61
(16:39:39) 63 69 6E 67 3D 30 20 63 65 6C 6C 70 61 64 64 69
(16:39:39) 6E 67 3D 30 3E 3C 74 72 3E 3C 74 64 20 77 69 64
(16:39:39) 74 68 3D 22 31 30 30 25 22 3E 0A 3C 74 61 62 6C
(16:39:39) 65 20 62 6F 72 64 65 72 3D 30 20 77 69 64 74 68
(16:39:39) 3D 31 30 30 25 20 63 65 6C 6C 73 70 61 63 69 6E
(16:39:39) 67 3D 30 20 63 65 6C 6C 70 61 64 64 69 6E 67 3D
(16:39:39) 30 3E 3C 74 72 3E 3C 74 64 20 76 61 6C 69 67 6E
(16:39:39) 3D 6D 69 64 64 6C 65 20 77 69 64 74 68 3D 22 31
(16:39:39) 25 22 3E 3C 41 20 48 52 45 46 3D 22 2F 75 70 64
(16:39:39) 2F 3F 68 74 74 70 3A 2F 2F 6D 79 2E 79 61 68 6F
(16:39:39) 6F 2E 63 6F 6D 2F 22 3E 3C 69 6D 67 20 73 72 63
(16:39:39) 3D 22 68 74 74 70 3A 2F 2F 75 73 2E 69 31 2E 79
(16:39:39) 69 6D 67 2E 63 6F 6D 2F 75 73 2E 79 69
(16:39:39) Dumped 0x3924A25 done 925
(16:39:47) Browser_Handler(392e398)::handle_input[4291038473], r_bytes=709
(16:39:47) Browser_Handler(392e398): Dumping raw incoming data . . .
(16:39:47) Dumping 0x3C1F960 size 709
(16:39:47) 47 45 54 20 68 74 74 70 3A 2F 2F 6C 6F 67 69 6E
(16:39:47) 2E 79 61 68 6F 6F 2E 63 6F 6D 2F 63 6F 6E 66 69
(16:39:47) 67 2F 76 65 72 69 66 79 3F 2E 64 6F 6E 65 3D 68
(16:39:47) 74 74 70 25 33 61 2F 2F 6D 79 2E 79 61 68 6F 6F
(16:39:47) 2E 63 6F 6D 20 48 54 54 50 2F 31 2E 30 0D 0A 41
(16:39:47) 63 63 65 70 74 3A 20 69 6D 61 67 65 2F 67 69 66
(16:39:47) 2C 20 69 6D 61 67 65 2F 78 2D 78 62 69 74 6D 61
(16:39:47) 70 2C 20 69 6D 61 67 65 2F 6A 70 65 67 2C 20 69
(16:39:47) 6D 61 67 65 2F 70 6A 70 65 67 2C 20 61 70 70 6C
(16:39:47) 69 63 61 74 69 6F 6E 2F 76 6E 64 2E 6D 73 2D 70
(16:39:47) 6F 77 65 72 70 6F 69 6E 74 2C 20 61 70 70 6C 69
(16:39:47) 63 61 74 69 6F 6E 2F 76 6E 64 2E 6D 73 2D 65 78
(16:39:47) 63 65 6C 2C 20 61 70 70 6C 69 63 61 74 69 6F 6E
(16:39:47) 2F 6D 73 77 6F 72 64 2C 20 2A 2F 2A 0D 0A 41 63
(16:39:47) 63 65 70 74 2D 4C 61 6E 67 75 61 67 65 3A 20 65
(16:39:47) 6E 2D 75 73 0D 0A 69 6B 65 6E 61 3A 20 73 68 61
(16:39:47) 72 65 64 0D 0A 50 72 6F 78 79 2D 43 6F 6E 6E 65
(16:39:47) 63 74 69 6F 6E 3A 20 4B 65 65 70 2D 41 6C 69 76
(16:39:47) 65 0D 0A 55 73 65 72 2D 41 67 65 6E 74 3A 20 4D
(16:39:47) 6F 7A 69 6C 6C 61 2F 34 2E 30 20 28 63 6F 6D 70
(16:39:47) 61 74 69 62 6C 65 3B 20 4D 53 49 45 20 35 2E 35
(16:39:47) 3B 20 57 69 6E 64 6F 77 73 20 39 38 29 0D 0A 48
(16:39:47) 6F 73 74 3A 20 6C 6F 67 69 6E 2E 79 61 68 6F 6F
(16:39:47) 2E 63 6F 6D 0D 0A 50 72 61 67 6D 61 3A 20 6E 6F
(16:39:47) 2D 63 61 63 68 65 0D 0A 43 6F 6F 6B 69 65 3A 20
(16:39:47) 42 3D 33 75 6A 38 76 31 70 6B 6E 34 6F 75 72 3B
(16:39:47) 20 49 3D 69 31 3D 31 75 31 76 32 32 32 36 32 39
(16:39:47) 32 70 34 37 34 39 34 67 34 75 35 35 37 31 37 61
(16:39:47) 37 64 61 30 61 63 61 64 62 30 62 33 62 64 62 70
(16:39:47) 63 30 63 31 63 67 63 6F 63 70 69 62 26 69 72 3D
(16:39:47) 37 38 3B 20 59 3D 76 3D 6C 26 6E 3D 39 38 74 70
(16:39:47) 6E 74 30 37 75 30 6C 6F 30 26 6C 3D 32 37 34 64
(16:39:47) 36 5F 70 37 30 64 36 2F 6F 2F 70 3D 6D 32 64 30
(16:39:47) 31 6F 39 34 31 30 30 62 30 34 26 72 3D 32 34 26
(16:39:47) 6C 67 3D 75 73 26 69 6E 74 6C 3D 75 73 3B 20 54
(16:39:47) 3D 7A 3D 54 68 77 66 36 41 54 6E 46 67 36 41 69
(16:39:47) 4E 75 5A 68 32 2F 65 6F 63 45 4E 6A 63 33 42 6A
(16:39:47) 59 7A 4E 7A 5A 50 4D 54 63 7A 4D 67 2D 2D 26 61
(16:39:47) 3D 67 45 45 26 73 6B 3D 44 41 41 35 4F 36 30 4D
(16:39:47) 47 4F 53 6F 46 78 26 64 3D 63 32 77 42 54 56 52
(16:39:47) 42 64 30 46 55 52 54 42 4E 52 45 55 30 54 6D 70
(16:39:47) 42 4D 45 35 52 4C 53 30 42 59 51 46 6E 52 55 55
(16:39:47) 42 61 57 63 42 61 55 46 56 65 6B 46 42 41 58 70
(16:39:47) 36 41 56 52 6F 64 32 59 32 51 57 64 58 51 51 2D
(16:39:47) 2D 0D 0A 0D 0A
(16:39:47) Dumped 0x3C1FC2S done 709
(16:39:47) Browser_Handler(392e398): Dumping parsed data . . .
(16:39:47) Dumping 0x393ECB4 size 686
(16:39:47) 47 45 54 20 2F 63 6F 6E 66 69 67 2F 76 65 72 69
(16:39:47) 66 79 3F 2E 64 6F 6E 65 3D 68 74 74 70 25 33 61
(16:39:47) 2F 2F 6D 79 2E 79 61 68 6F 6F 2E 63 6F 6D 20 48
(16:39:47) 54 54 50 2F 31 2E 30 0D 0A 43 6F 6F 6B 69 65 3A
(16:39:47) 20 42 3D 62 35 6B 37 6F 71 38 74 37 75 37 62 34
(16:39:47) 26 62 3D 32 3B 20 59 3D 76 3D 31 26 6E 3D 39 38
(16:39:47) 74 70 6E 74 30 37 75 30 6C 6F 30 26 6C 3D 32 37
(16:39:47) 34 64 36 5F 70 37 30 64 36 2F 6F 2F 70 3D 6D 32
(16:39:47) 64 30 31 6F 39 34 31 31 30 62 30 34 26 72 3D 32
(16:39:47) 34 26 6C 67 3D 75 73 26 69 6E 74 6C 3D 75 73 3B
(16:39:47) 20 54 3D 7A 3D 73 31 78 66 36 41 73 37 47 67 36
(16:39:47) 41 30 30 75 45 45 51 79 67 31 7A 38 4E 6A 63 33
(16:39:47) 42 6A 59 7A 4E 7A 5A 50 4D 54 63 7A 4D 67 2D 2D
```

"100%"cellspa-
cing=0 cellpad-
ding=0><tr><td width=
"100%">.<table
border=0 width
=100% cellspacing=
0 cellpadding=
0><tr><td valign
=middle width=" 1
%"><A HREF="/upd/
?http://my.yahoo.com/
"><img src
="http://us.i1,y
img.com/us.yi GET http://login
.yahoo.com/config/
verify?.done=
http%3a//my.yahoo
.com HTTP/1.0..
Accept: image/gif,
image/x-xbitmap,
image/jpeg,
image/pjpeg, appli-
cation/vnd.ms-pow-
erpoint, appli-
cation/vnd.ms-ex-
cel, application/
msword, */*..
Accept-Language:
en-us..ikena:
shared..Proxy-Conn-
ection: Keep-Alive
..User-Agent:
Mozilla/4.0 (compa-
tible; MSIE 5.5;
Windows 98)..
Host: login.yahoo
.com..Pragma: no-
cache..Cookie:
B=3uj8v1pkn4our;
I=i1=1u1v222629
2p47494g4u55717a
7da0acadb0b3bdbp
c0c1cgcocpib&ir=
78; Y=v=l&n=98tp
nt07u0lo0&l=274d
6_p70d6/o&p=m2d0
lo94100b04&r=24&
lg=us&intl=us; T=
z=Thwf6ATnFg6Ai
NuZh2/eocENjc3Bj
YzNzZPMTczMg--&a=
gEE&sk=DAA5O60M
GOSoFx&d=c2wBTVR
Bd0FURTBNREU0Tmp
BME5RLS0BYQFnRUU
BaWcBaUFVekFBAXp
6AVRod2Y2QWdXQQ-
. . .

GET /config/verify
?.done=http%3a
//my.yahoo.com
HTTP/1.0..Cookie:
B=b5k7oq8t7u7b4
&b=2; Y=v=l&n=98
tpnt07u0lo0&l=27
4d6_p70d6/o&p=m2
d01o94110b04&r=2
4&lg=us&intl=us;
T=z=slxf6As7Gg6
A00uEEQyg1z8Njc3
BjYzNzZPMTczMg--

APPENDIX II-continued

| | |
|---|---|
| (16:39:47) 26 61 3D 67 45 45 26 73 6B 3D 44 41 41 77 6B 34 | &a=gEE&sk=DAAwk4 |
| (16:39:47) 70 68 50 78 50 4E 57 63 26 64 3D 63 32 77 42 54 | phPxPNWc&d=c2wBT |
| (16:39:47) 56 52 42 64 30 46 55 52 54 42 4E 52 45 55 30 54 | VRBd0FURTBNREU0T |
| (16:39:47) 6D 70 42 4D 45 35 52 4C 53 30 42 59 51 46 6E 52 | mpBME5RLS0BYQFnR |
| (16:39:47) 55 55 42 61 57 63 42 61 55 46 56 65 6B 46 42 41 | UUBaWcBaUFVekFBA |
| (16:39:47) 58 70 36 41 58 4D 78 65 47 59 32 51 57 64 58 51 | Xp6AXMxeGY2QWdXQ |
| (16:39:47) 51 2D 2D 3B 20 49 3D 69 31 3D 30 31 30 34 30 67 | Q--;I=il=01040g |
| (16:39:47) 31 75 31 76 32 34 32 36 32 39 32 70 33 68 34 39 | 1u1v2426292p3h49 |
| (16:39:47) 34 67 34 75 37 31 37 32 37 61 37 64 37 66 37 69 | 4g4u71727a7d7f7i |
| (16:39:47) 37 6F 38 34 39 6A 61 30 61 6E 62 33 62 64 62 68 | 7o849ja0anb3bdbh |
| (16:39:47) 62 70 63 30 63 31 63 62 63 70 63 73 63 75 65 6D | bpc0c1cbcpcscuem |
| (16:39:47) 26 69 72 3D 37 63 0D 0A 41 63 63 65 70 74 3A 20 | &ir=7c..Accept: |
| (16:39:47) 69 6D 61 67 65 2F 67 69 66 20 20 69 6D 61 67 65 | image/gif, image |
| (16:39:47) 2F 78 2D 78 62 69 74 6D 61 70 20 20 69 6D 61 67 | /x-xbitmap, image/ |
| (16:39:47) 65 2F 6A 70 65 67 20 20 69 6D 61 67 65 2F 70 6A | jpeg, image/pj |
| (16:39:47) 70 65 67 20 20 61 70 70 6C 69 63 61 74 69 6F 6E | peg, application |
| (16:39:47) 2F 76 6E 64 2E 6D 73 2D 70 6F 77 65 72 70 6F 69 | /vnd.ms-powerpoint, |
| (16:39:47) 6E 74 20 20 61 70 70 6C 69 63 61 74 69 6F 6E 2F | application/ |
| (16:39:47) 76 6E 64 2E 6D 73 2D 65 78 63 65 6C 20 20 61 70 | vnd.ms-excel, app- |
| (16:39:47) 70 6C 69 63 61 74 69 6F 6E 2F 6D 73 77 6F 72 64 | lication/msword, |
| (16:39:47) 20 20 2A 2F 2A 0D 0A 41 63 63 65 70 74 2D 40 61 | */* ...Accept-Lan |
| (16:39:47) 6E 67 75 61 67 65 3A 20 65 6E 2D 75 73 0D 0A 43 | guage: en-us.. |
| (16:39:47) 6F 6E 6E 65 63 74 69 6F 6E 3A 20 4B 65 65 70 2D | Connection: Keep- |
| (16:39:47) 41 60 69 76 65 0D 0A 55 73 65 72 2D 41 67 65 6E | Alive..User-Agent: |
| (16:39:47) 74 3A 20 4D 6F 7A 69 60 60 61 2F 34 2E 30 20 28 | Mozilla/4.0 ( |
| (16:39:47) 63 6F 6D 70 61 74 69 62 60 65 3B 20 4D 53 49 45 | compatible; MSIE |
| (16:39:47) 20 35 2E 35 3B 20 57 69 6E 64 6F 77 73 20 39 38 | 5.5; Windows 98 |
| (16:39:47) 29 0D 0A 48 6F 73 74 3A 20 60 6F 67 69 6E 2E 79 | )..Host: login. |
| (16:39:47) 61 68 6F 6F 2E 63 6F 6D 0D 0A 50 72 61 67 6D 61 | yahoo.com..Pragma: |
| (16:39:47) 3A 20 6E 6F 2D 63 61 63 68 65 0D 0A 0D 0A | no-cache . . . |
| (16:39:47) Dumped 0x393EF62 done 686 | |
| w/o cookie management, no flag "ikena: shared" | |
| (16:39:25) Browser_Handler(39082d8)::handle_input[4291038473], r_bytes=310 | |
| (16:39:25) Browser_Handler(39082d8): Dumping raw incoming data . . . | |
| (16:39:25) Dumping 0x3ClF960 size 310 | |
| (16:39:25) 47 45 54 20 68 74 74 70 3A 2F 2F 77 77 77 2E 69 | GET http://www. |
| (16:39:25) 6B 65 6E 61 2E 63 6F 6D 2F 67 72 6F 75 70 2F 62 | ikena.com/group/ |
| (16:39:25) 65 67 69 6E 2E 63 66 6D 20 48 54 54 50 2F 31 2E | begin.cfm HTTP/1. |
| (16:39:25) 30 0D 0A 41 63 63 65 70 74 3A 20 2A 2F 2A 0D 0A | 0..Accept: */*.. |
| (16:39:25) 41 63 63 65 70 74 2D 4C 61 6E 67 75 61 67 65 3A | Accept-Language: |
| (16:39:25) 20 65 6E 2D 75 73 0D 0A 43 6F 6F 6B 69 65 3A 20 | en-us..Cookie: |
| (16:39:25) 43 46 49 44 3D 32 38 3B 20 43 46 54 4F 4B 45 4E | CFID=28; CFTOKEN |
| (16:39:25) 3D 36 30 33 35 35 33 31 30 3B 20 52 45 46 43 49 | =60355310; REFCI |
| (16:39:25) 44 3D 3B 20 52 45 46 45 52 53 49 54 45 49 44 3D | D=; REFERSITEID= |
| (16:39:25) 31 3B 20 52 45 46 53 43 4F 52 45 3D 30 3B 20 53 | 1; REFSCORE=0; S |
| (16:39:25) 55 42 5F 53 45 43 54 49 4F 4E 53 3D 3B 20 3B 20 | UB_SECTIONS=;; |
| (16:39:25) 53 55 42 5F 53 45 43 54 49 4F 4E 53 5F 4C 49 4E | SUB_SECTIONS_LIN |
| (16:39:25) 4B 53 3D 0D 0A 55 73 65 72 2D 41 67 65 6E 74 3A | KS=..User-Agent: |
| (16:39:25) 20 4D 6F 7A 69 6C 6C 61 2F 34 2E 30 20 28 43 6F | Mozilla/4.0 (Com- |
| (16:39:25) 6D 70 61 74 69 62 6C 65 3B 20 4D 53 49 45 20 35 | patible; MSIE 5 |
| (16:39:25) 2E 35 3B 20 57 69 6E 64 6F 77 73 20 39 38 29 0D | .5; Windows 98). |
| (16:39:25) 0A 48 6F 73 74 3A 20 77 77 77 2E 69 6B 65 6E 61 | .Host: www.ikena |
| (16:39:25) 2E 63 6F 6D 0D 0A 50 72 6F 78 79 2D 43 6F 6E 6E | .com..Proxy-Conn- |
| (16:39:25) 65 63 74 69 6F 6E 3A 20 4B 65 65 70 2D 41 6C 69 | ection: Keep-Alive . . . |
| (16:39:25) 76 65 0D 0A 0D 0A | |
| (16:39:25) Dumped 0x3ClFA96 done 310 | |
| (16:39:25) Browser_Handler(39082d8): Dumping parsed data . . . | |
| (16:39:25) Dumping 0x3918BF4 size 282 | |
| (16:39:25) 47 45 54 20 2F 67 72 6F 75 70 2F 62 65 67 69 6E | GET/group/begin |
| (16:39:25) 2E 63 66 6D 20 48 54 54 50 2F 31 2E 30 0D 0A 43 | .cfrn HTTP/1.0.. |
| (16:39:25) 6F 6F 6B 69 65 3A 20 43 46 49 44 3D 32 38 3B 20 | Cookie: CFID=28; |
| (16:39:25) 43 46 54 4F 4B 45 4E 3D 36 30 33 35 35 33 31 30 | CFTOKEN=60355310; |
| (16:39:25) 3B 20 52 45 46 43 49 44 3D 3B 20 52 45 46 45 52 | REFCID=;REFER |
| (16:39:25) 53 49 54 45 49 44 3D 31 3B 20 52 45 46 53 43 4F | SITEID=1; REFSCO |
| (16:39:25) 52 45 3D 30 3B 20 53 55 42 5F 53 45 43 54 49 4F | RE=0; SUB_SECTIONS=; |
| (16:39:25) 4E 53 3D 3B 20 53 55 42 5F 53 45 43 54 49 4F 4E | SUB_SECTION |
| (16:39:25) 53 5F 4C 49 4E 4B 53 3D 0D 0A 41 63 63 65 70 74 | TIONS_LINKS=..Accept: |
| (16:39:25) 3A 20 2A 2F 2A 0D 0A 41 63 63 65 70 74 2D 4C 61 | */*Accept..Lan- |
| (16:39:25) 6E 67 75 61 67 65 3A 20 65 6E 2D 75 73 0D 0A 55 | guage: en-us.. |
| (16:39:25) 73 65 72 2D 41 67 65 6E 74 3A 20 4D 6F 7A 69 6C | User-Agent: Mozilla/ |
| (16:39:25) 6C 61 2F 34 2E 30 20 28 63 6F 6D 70 61 74 69 62 | 4.0 (compatible; |
| (16:39:25) 6C 65 3B 20 4D 53 49 45 20 35 2E 35 3B 20 57 69 | MSIE 5.5; Win- |
| (16:39:25) 6E 64 6F 77 73 20 39 38 29 0D 0A 48 6F 73 74 3A | dows 98)..Host: |
| (16:39:25) 20 77 77 77 2E 69 6B 65 6E 61 2E 63 6F 6D 0D 0A | www.ikena.com.. |
| (16:39:25) 43 6F 6E 6E 65 63 74 69 6F 6E 3A 20 4B 65 65 70 | Connection: Keep- |
| (16:39:25) 2D 41 6C 69 76 65 0D 0A 0D 0A | Alive . . . |
| (16:39:25) Dumped 0x3918D0E done 282 | |

The invention claimed is:

1. A group-browsing system comprising:
   a group of client computers including a first client computer and other client computers; wherein each of said group of client computers securely share and display a shared web browser;
   a server linked to the shared web browser and the server configured to (1) monitor a transmission of a web site URL request from the shared web browser of the first client computer and (2) direct the web site URL request to the shared web browser of the other client computers; and
   gatekeeper modules of the respective said group of client computers; wherein, each of the gatekeeper modules are configured to (1) mask an identity of each of said group of client computers to prevent a web site corresponding to the web site URL request from retrieving an actual identifier of the first client computer, and (2) create a same temporary identifier for each of said group of client computers when a user of the first client computer logs on to the web site so that a same web page corresponding to the web site URL request is displayed securely at each said group of client computers.

2. The system of claim 1 in which the group-browsing system is a scalable secure system.

3. The system of claim 1 in which the gatekeeper module resides on each client.

4. The system of claim 1 in which the actual identifier is a cookie and the temporary identifier is a temporary cookie.

5. The system of claim 1 in which the gatekeeper further including means for deleting the temporary identifier at the end of a group-browsing session to prevent any client from returning to the web site identified as another client.

6. The system of claim 1 in which the gatekeeper further including means for generating a warning message when any client logs on to the web site to inform that client that the other clients in the group will now be able to access that clients private information.

7. The system of claim 1 further including means for tracking the actions of all the clients for billing purposes.

8. The system of claim 1 further including client software configured to detect the end of a group-browsing session and, in response, to direct a client's secure browser to transmit the web site URL to allow the client to return to the previously accessed web site.

9. A gatekeeper system for group-browsing, the system comprising:
   a group of client computers including a first client computer and other client computers; wherein each of said group of client computers securely share and display a shared web browser;
   a server linked to the shared web browser and the server configured to (1) monitor a transmission of a web site URL request from the shared web browser of the first client computer and (2) direct the web site URL request to the shared web browser of the other client computers;
   gatekeeper modules of the respective said group of client computers;
   means for masking an identity of each of said group of client computers to prevent a web site corresponding to the web site URL request from retrieving an actual identifier of the first client computer; and
   means for creating a same temporary identifier for each of said group of client computers when a user of the first client computer logs on to the web site so that a same web page corresponding to the web site URL request is displayed securely at each said group of client computers.

10. The system of claim 9 in which the actual identifier is a cookie and the temporary identifier is a temporary cookie.

11. The system of claim 9 further including means for deleting the temporary identifier at the end of a group-browsing session.

12. A group-browsing method for a group of client computers including a first client computer and other client computers; wherein, each of said group of client computers securely share and display a shared web browser, the method comprising:
   linking a server to the shared web browser;
   using the server to configure to (1) monitor a transmission of a web site URL request from the shared web browser of the first client computer and (2) direct the web site URL request to the shared web browser of the other client computers;
   masking an identity of each of said group of client computers to prevent a web site corresponding to the web site URL request from retrieving an actual identifier of the first client computer; and
   creating a same temporary identifier for each of said group of client computers when a user of the first client computer logs on to the web site so that a same web page corresponding to the web site URL request is displayed securely at each said group of client computers; wherein, the masking and the creating steps are performed by each of gatekeeper modules of the respective said group of client computers.

13. The system of claim 12 in which the actual identifier is a cookie and the temporary identifier is a temporary cookie.

14. The method of claim 12 further including deleting the temporary identifier at the end of a group-browsing session to prevent any client from returning to the web site identified as another client.

15. The method of claim 12 in which the step of configuring the gatekeeper further including generating a warning message when any client logs on to the web site to inform that client that the other clients in the group will now be able to access that client's private information.

16. The method of claim 12 further including tracking the actions of all the clients for billing purposes.

17. The method of claim 12 further including configuring a client software to detect the end of a group-browsing session and, in response, directing a client's secure browser to transmit the web site URL to allow the client to return to the previously accessed web site.

18. A group-browsing method comprising:
   securely sharing and displaying a shared web browser by each of a group of client computers; wherein, the group of client computers include a first client computer and other client computers;
   linking a server to the shared web browser;
   using the server to configure to (1) monitor a transmission of a web site URL request from the shared web browser of the first client computer and (2) direct the web site URL request to the shared web browser of the other client computers;
   masking an identity of each of said group of client computers to prevent a web site corresponding to the web site URL request from retrieving an actual identifier of the first of the client computer; and
   creating a same temporary identifier for each of said group of client computers when a user of the first client computer logs on to the web site so that a same web page corresponding to the web site URL request is displayed securely at each said group of client computers; wherein, the masking and the creating steps are performed by each of gatekeeper modules of the respective said group of client computers.

19. The method of claim 18 in which the identifier is a cookie and the temporary identifier is a temporary cookie.

20. The method of claim 18 further including deleting the temporary identifier at the end of a group-browsing session.

* * * * *

UNITED STATES PATENT AND TRADEMARK OFFICE
CERTIFICATE OF CORRECTION

PATENT NO. : 7,139,799 B2
APPLICATION NO. : 09/777959
DATED : November 21, 2006
INVENTOR(S) : Qian et al.

It is certified that error appears in the above-identified patent and that said Letters Patent is hereby corrected as shown below:

Col. 3, line 3, please change "clients" to --client's--.

Col. 4, line 6, please change "screenshorts" to --screenshots--.

Col. 11, line 78, please change "m_n_bytes to _receive" to -- m_n_bytes_to _receive--.

Col. 13, line 37 of Appendix II, after "6F 63" please change "4S" to --45--.

Col. 16, line 32, please change "lication/vnd.ms" to -- lication/vnd.ms- --;

line 70, please change "/bead>.<body bg" to --/head>.<body bg.--.

Col. 18, lines 15-17, please change "u.{.{.//-->.</;script" to --u;.}.}.//-->.</script;--.

Col. 19, line 55, after "4E 75" please change "SA" to --5A--;

line 64, please change "0x3ClFC2S" to --0x3C1FC25--;

line 73, after "75 30" please change "60" to --6C--.

Col. 20, line 13, please change "="http://us.il,y" to --="http://us.il.y--.

Col. 21, line 4, after "35 52" please change "40" to --4C--;

line 13, after "69 66" please change "20" to --2C--;

line 14, after "61 70" please change "20" to --2C--;

line 15, after "65 67" please change "20" to --2C--;

line 16, after "65 67" please change "20" to --2C--;

line 16, after "70 70" please change "60" to --6C--;

line 18, after "6E 74" please change "20" to --2C--;

line 18, after "70 70" please change "60" to --6C--;

line 19, after "63 65" please change "60 20" to --6C 2C--;

line 20, after "70" please change "60" to --6C--;

UNITED STATES PATENT AND TRADEMARK OFFICE
CERTIFICATE OF CORRECTION

PATENT NO. : 7,139,799 B2
APPLICATION NO. : 09/777959
DATED : November 21, 2006
INVENTOR(S) : Qian et al.

It is certified that error appears in the above-identified patent and that said Letters Patent is hereby corrected as shown below:

Col. 21, line 21, after "(16:39:47) " please change "20 20" to --2C 20--;

line 21, after "74 2D" please change "40" to --4C--;

line 24, after "(16:39:47) " please change "41 60" to --41 6C--;

line 25, after "7A 69" please change "60 60" to --6C 6C--;

line 26, after "69 62" please change "60" to --6C--;

line 28, after "3A 20" please change "60" to --6C--.

Col. 22, line 60, please change ".cfrn" to --.cfm--;

line 67, please change "TIONS_LINKS" to --S_LINKS--;

lines 68-69, please change "*/*Accept..Lan-guage:" to --*/*..Accept-Language:--.

Col. 24, line 23, after "first" insert --of the--;

line 32, please change "system" to --method--;

line 64, after "URL" please delete "request".

Signed and Sealed this

Fifteenth Day of May, 2007

JON W. DUDAS
*Director of the United States Patent and Trademark Office*